United States Patent
Narayanaswamy

(10) Patent No.: US 11,856,022 B2
(45) Date of Patent: Dec. 26, 2023

(54) METADATA-BASED DETECTION AND PREVENTION OF PHISHING ATTACKS

(71) Applicant: Netskope, Inc., Santa Clara, CA (US)

(72) Inventor: Krishna Narayanaswamy, Saratoga, CA (US)

(73) Assignee: Netskope, Inc., Santa Clara, CA (US)

(*) Notice: Subject to any disclaimer, the term of this patent is extended or adjusted under 35 U.S.C. 154(b) by 355 days.

(21) Appl. No.: 17/157,947

(22) Filed: Jan. 25, 2021

(65) Prior Publication Data

US 2021/0234892 A1 Jul. 29, 2021

Related U.S. Application Data

(60) Provisional application No. 62/966,412, filed on Jan. 27, 2020.

(51) Int. Cl.
*H04L 29/06* (2006.01)
*H04L 9/40* (2022.01)
(Continued)

(52) U.S. Cl.
CPC ...... *H04L 63/1483* (2013.01); *G06F 21/6245* (2013.01); *H04L 63/1425* (2013.01); *H04L 63/20* (2013.01); *H04L 67/02* (2013.01)

(58) Field of Classification Search
CPC ..... H04L 67/02; H04L 63/1483; H04L 63/20; H04L 63/1466; H04L 63/1425;
(Continued)

(56) References Cited

U.S. PATENT DOCUMENTS 4,574,346 A 3/1986 Hartung
5,452,460 A 9/1995 Distelberg et al.
(Continued)

FOREIGN PATENT DOCUMENTS

CN 111147490 A * 5/2020
JP 2011234178 A 11/2011
(Continued)

OTHER PUBLICATIONS

Cheng et al., "Cloud Security for Dummies, Netskope Special Edition" John Wiley & Sons, Inc. 2015, 53 pages.
(Continued)

*Primary Examiner* — Tri M Tran

(57) ABSTRACT

The technology disclosed intercepts a webpage rendered by a server in response to a user action executed on a client. The technology disclosed analyzes one or more images of the webpage and determines that a particular hosted service is represented by the images. It analyzes one or more fields of the webpage and determines that the fields elicit confidential information. The technology disclosed intercepts a request generated by the client in response to another user action providing the confidential information via the fields. The technology disclosed analyses the request and determines that the confidential information is being exfiltrated to an unsanctioned resource. This determination is made by comparing a resource address in the request with one or more sanctioned resource addresses used by the particular hosted service. The technology disclosed determines that the webpage is effectuating a phishing attack and blocks transmission of the confidential information to the unsanctioned resource.

19 Claims, 12 Drawing Sheets

(51) Int. Cl.
*G06F 21/62* (2013.01)
*H04L 67/02* (2022.01)

(58) Field of Classification Search
CPC .... H04L 69/22; H04W 12/12; G06F 21/6245; G06F 2221/2119
See application file for complete search history.

(56) References Cited

U.S. PATENT DOCUMENTS

| | | |
|---|---|---|
| 6,502,192 B1 | 12/2002 | Nguyen |
| 6,574,655 B1 | 6/2003 | Libert et al. |
| 6,687,732 B1 | 2/2004 | Bector et al. |
| 6,829,654 B1 | 12/2004 | Jungck |
| 6,898,636 B1 | 5/2005 | Adams et al. |
| 6,981,155 B1 | 12/2005 | Lyle et al. |
| 7,231,426 B1 | 6/2007 | Hall et al. |
| 7,234,168 B2 | 6/2007 | Gupta et al. |
| 7,296,058 B2 | 11/2007 | Throop |
| 7,475,146 B2 | 1/2009 | Bazot et al. |
| 7,536,439 B1 | 5/2009 | Jaladanki et al. |
| 7,587,499 B1 | 9/2009 | Haghpassand |
| 7,769,994 B2 | 8/2010 | Peles |
| 7,908,472 B2 | 3/2011 | Freed et al. |
| 7,996,373 B1 | 8/2011 | Zoppas et al. |
| 8,280,986 B2 | 10/2012 | Deprun |
| 8,281,372 B1 | 10/2012 | Vidal |
| 8,346,580 B2 | 1/2013 | Nakfoor |
| 8,363,650 B2 | 1/2013 | Rao et al. |
| 8,365,243 B1 | 1/2013 | Lu et al. |
| 8,544,060 B1 | 9/2013 | Khetawat |
| 8,549,300 B1 | 10/2013 | Kumar et al. |
| 8,566,932 B1 | 10/2013 | Hotta et al. |
| 8,572,758 B1 | 10/2013 | Clifford |
| 8,613,040 B2 | 12/2013 | Barile |
| 8,640,216 B2 | 1/2014 | Anderson et al. |
| 8,677,448 B1 | 3/2014 | Kauffman et al. |
| 8,763,072 B2 | 6/2014 | Agrawal |
| 8,856,869 B1 | 10/2014 | Brinskelle |
| 8,892,665 B1 | 11/2014 | Rostami-Hesarsorkh et al. |
| 8,914,461 B2 | 12/2014 | Murai |
| 8,914,892 B2 | 12/2014 | Karande et al. |
| 8,925,069 B2 | 12/2014 | Louboutin et al. |
| 8,959,329 B2 | 2/2015 | Altman |
| 9,069,436 B1 | 6/2015 | Fieweger et al. |
| 9,069,955 B2 | 6/2015 | Dolph et al. |
| 9,069,992 B1 | 6/2015 | Vaikar et al. |
| 9,122,869 B1 | 9/2015 | Sobel et al. |
| 9,137,131 B1 | 9/2015 | Sarukkai et al. |
| 9,185,088 B1 | 11/2015 | Bowen |
| 9,197,628 B1 | 11/2015 | Hastings |
| 9,230,096 B2 | 1/2016 | Sarin et al. |
| 9,246,944 B1 | 1/2016 | Chen |
| 9,246,948 B2 | 1/2016 | Jaiswal et al. |
| 9,256,727 B1 | 2/2016 | Manmohan |
| 9,270,765 B2 | 2/2016 | Narayanaswamy et al. |
| 9,398,102 B2 | 7/2016 | Narayanaswamy et al. |
| 9,405,904 B1 | 8/2016 | Fang et al. |
| 9,418,232 B1 | 8/2016 | Khetawat et al. |
| 9,438,506 B2 | 9/2016 | Ryland |
| 9,460,179 B1 | 10/2016 | Gunaratne et al. |
| 9,537,884 B1 | 1/2017 | Raugas et al. |
| 9,553,860 B2 | 1/2017 | Meyer |
| 9,626,528 B2 | 4/2017 | Butler |
| 9,692,759 B1 | 6/2017 | Chandrasekhar |
| 9,917,817 B1 | 3/2018 | Lad et al. |
| 9,928,377 B2 | 3/2018 | Narayanaswamy et al. |
| 9,998,496 B2 | 6/2018 | Narayanaswamy et al. |
| 10,142,362 B2 | 11/2018 | Weith et al. |
| 10,162,767 B2 | 12/2018 | Spurlock et al. |
| 10,178,120 B1 | 1/2019 | Keegan et al. |
| 10,248,797 B1 | 4/2019 | Shinde et al. |
| 10,277,625 B1 | 4/2019 | Efstathopoulos et al. |
| 10,291,651 B1 | 5/2019 | Chaubey |
| 10,291,657 B2 | 5/2019 | Narayanaswamy et al. |
| 10,404,755 B2 | 9/2019 | Narayanaswamy et al. |
| 10,404,756 B2 | 9/2019 | Narayanaswamy et al. |
| 10,440,036 B2 | 10/2019 | Pal et al. |
| 10,454,933 B2 | 10/2019 | Chenard et al. |
| 10,491,638 B2 | 11/2019 | Narayanaswamy et al. |
| 10,757,090 B2 | 8/2020 | Kahol et al. |
| 10,764,313 B1 | 9/2020 | Mushtaq |
| 10,812,531 B2 | 10/2020 | Narayanaswamy et al. |
| 10,826,940 B2 | 11/2020 | Narayanaswamy et al. |
| 10,855,671 B2 | 12/2020 | Kahol et al. |
| 10,860,730 B1 | 12/2020 | Weaver et al. |
| 10,862,916 B2 | 12/2020 | Hittel et al. |
| 10,979,458 B2 | 4/2021 | Narayanaswamy et al. |
| 11,019,101 B2 | 5/2021 | Narayanaswamy et al. |
| 11,064,013 B2 | 7/2021 | Cheng et al. |
| 11,089,064 B1 | 8/2021 | Sarukkai et al. |
| 2001/0011238 A1 | 8/2001 | Eberhard et al. |
| 2001/0054157 A1 | 12/2001 | Fukumoto |
| 2002/0016773 A1 | 2/2002 | Ohkuma et al. |
| 2002/0091532 A1 | 7/2002 | Viets et al. |
| 2002/0138593 A1 | 9/2002 | Novak et al. |
| 2003/0191989 A1 | 10/2003 | OSullivan |
| 2004/0001443 A1 | 1/2004 | Soon et al. |
| 2004/0088423 A1 | 5/2004 | Miller et al. |
| 2004/0122977 A1 | 6/2004 | Moran et al. |
| 2004/0128538 A1 | 7/2004 | Gmuender et al. |
| 2004/0268451 A1 | 12/2004 | Robbin et al. |
| 2005/0086197 A1 | 4/2005 | Boubez et al. |
| 2005/0251856 A1 | 11/2005 | Araujo et al. |
| 2006/0248045 A1 | 11/2006 | Toledano et al. |
| 2007/0006293 A1 | 1/2007 | Balakrishnan et al. |
| 2007/0011319 A1 | 1/2007 | McClure et al. |
| 2007/0220251 A1 | 9/2007 | Rosenberg et al. |
| 2007/0289006 A1 | 12/2007 | Ramachandran et al. |
| 2008/0034418 A1 | 2/2008 | Venkatraman et al. |
| 2008/0127303 A1 | 5/2008 | Wrighton et al. |
| 2008/0189778 A1 | 8/2008 | Rowley |
| 2008/0229428 A1 | 9/2008 | Camiel |
| 2008/0250390 A1 | 10/2008 | Feblowitz et al. |
| 2008/0263215 A1 | 10/2008 | Schnellbaecher |
| 2008/0301231 A1 | 12/2008 | Mehta et al. |
| 2009/0100077 A1 | 4/2009 | Jung et al. |
| 2009/0225762 A1 | 9/2009 | Davidson et al. |
| 2009/0328188 A1 | 12/2009 | Raymer et al. |
| 2010/0024008 A1 | 1/2010 | Hopen et al. |
| 2010/0146260 A1 | 6/2010 | Levow et al. |
| 2010/0146269 A1 | 6/2010 | Baskaran |
| 2010/0169472 A1 | 7/2010 | Okamoto et al. |
| 2010/0188975 A1 | 7/2010 | Raleigh |
| 2010/0251369 A1 | 9/2010 | Grant |
| 2010/0287613 A1 | 11/2010 | Singh et al. |
| 2010/0325287 A1 | 12/2010 | Jagadeeswaran et al. |
| 2011/0016197 A1 | 1/2011 | Shiimori et al. |
| 2011/0154506 A1 | 6/2011 | Osullivan et al. |
| 2011/0196914 A1 | 8/2011 | Tribbett |
| 2011/0247045 A1 | 10/2011 | Rajagopal et al. |
| 2011/0321170 A1 | 12/2011 | Onodera et al. |
| 2012/0008786 A1 | 1/2012 | Cronk et al. |
| 2012/0020307 A1 | 1/2012 | Henderson et al. |
| 2012/0042361 A1 | 2/2012 | Wong et al. |
| 2012/0237908 A1 | 9/2012 | Fitzgerald et al. |
| 2012/0278872 A1 | 11/2012 | Woelfel et al. |
| 2013/0145483 A1 | 6/2013 | Dimuro et al. |
| 2013/0191627 A1 | 7/2013 | Ylonen et al. |
| 2013/0268677 A1 | 10/2013 | Marshall et al. |
| 2013/0298192 A1 | 11/2013 | Kumar et al. |
| 2013/0347085 A1 | 12/2013 | Hawthorn et al. |
| 2014/0007182 A1 | 1/2014 | Qureshi et al. |
| 2014/0007222 A1 | 1/2014 | Qureshi et al. |
| 2014/0026182 A1 | 1/2014 | Pearl et al. |
| 2014/0032691 A1 | 1/2014 | Barton et al. |
| 2014/0053280 A1 | 2/2014 | Durazzo et al. |
| 2014/0082204 A1 | 3/2014 | Shankar et al. |
| 2014/0115702 A1 | 4/2014 | Li et al. |
| 2014/0165148 A1 | 6/2014 | Dabbiere et al. |
| 2014/0165213 A1 | 6/2014 | Stuntebeck |
| 2014/0181971 A1 | 6/2014 | Tatarinov et al. |
| 2014/0245381 A1 | 8/2014 | Stuntebeck et al. |
| 2014/0259190 A1 | 9/2014 | Kiang et al. |
| 2014/0269279 A1 | 9/2014 | Ismail et al. |

(56) References Cited

U.S. PATENT DOCUMENTS

| | | |
|---|---|---|
| 2014/0310392 A1 | 10/2014 | Ho |
| 2014/0317681 A1 | 10/2014 | Shende |
| 2014/0337862 A1 | 11/2014 | Valencia et al. |
| 2014/0344573 A1 | 11/2014 | Tsai et al. |
| 2014/0380491 A1 | 12/2014 | Abuelsaad et al. |
| 2015/0074744 A1 | 3/2015 | McLean et al. |
| 2015/0088791 A1 | 3/2015 | Lin et al. |
| 2015/0113264 A1 | 4/2015 | Wang et al. |
| 2015/0135302 A1 | 5/2015 | Cohen et al. |
| 2015/0200924 A1 | 7/2015 | Parla et al. |
| 2015/0205973 A1 | 7/2015 | Huh et al. |
| 2015/0254469 A1 | 9/2015 | Butler |
| 2015/0271207 A1 | 9/2015 | Jaiswal et al. |
| 2015/0319156 A1 | 11/2015 | Guccione et al. |
| 2015/0347447 A1 | 12/2015 | Ho et al. |
| 2016/0087970 A1 | 3/2016 | Kahol et al. |
| 2016/0134653 A1 | 5/2016 | Vallone et al. |
| 2016/0188880 A1 | 6/2016 | Smith et al. |
| 2016/0241528 A1 | 8/2016 | Kulkarni et al. |
| 2016/0253352 A1 | 9/2016 | Kluck et al. |
| 2016/0269467 A1 | 9/2016 | Lee et al. |
| 2016/0275577 A1 | 9/2016 | Kolluri Venkata Sesha et al. |
| 2016/0277374 A1 | 9/2016 | Reid et al. |
| 2016/0292445 A1 | 10/2016 | Lindemann |
| 2016/0306980 A1 | 10/2016 | Kotler et al. |
| 2016/0330219 A1 | 11/2016 | Hasan |
| 2016/0350539 A1 | 12/2016 | Oberheide et al. |
| 2017/0063720 A1 | 3/2017 | Foskett et al. |
| 2017/0063886 A1 | 3/2017 | Muddu et al. |
| 2017/0078323 A1 | 3/2017 | Ross |
| 2017/0091482 A1 | 3/2017 | Sarin et al. |
| 2017/0195427 A1 | 7/2017 | Choquette et al. |
| 2017/0201537 A1 | 7/2017 | Caldwell et al. |
| 2017/0206353 A1 | 7/2017 | Jai et al. |
| 2017/0213037 A1 | 7/2017 | Toledano et al. |
| 2017/0223054 A1 | 8/2017 | Wing et al. |
| 2017/0251013 A1 | 8/2017 | Kirti et al. |
| 2017/0251370 A1 | 8/2017 | Liljenstam et al. |
| 2017/0286229 A1 | 10/2017 | Cheung |
| 2017/0286690 A1 | 10/2017 | Chari et al. |
| 2017/0302685 A1 | 10/2017 | Ladnai et al. |
| 2017/0353496 A1 | 12/2017 | Pai et al. |
| 2018/0020018 A1 | 1/2018 | Walheim et al. |
| 2018/0048668 A1 | 2/2018 | Gupta et al. |
| 2018/0048669 A1 | 2/2018 | Lokamathe et al. |
| 2018/0146004 A1 | 5/2018 | Belfiore et al. |
| 2018/0181761 A1 | 6/2018 | Sinha et al. |
| 2018/0190146 A1 | 7/2018 | Bodnarium |
| 2018/0191727 A1 | 7/2018 | Baldwin et al. |
| 2018/0239902 A1 | 8/2018 | Godard et al. |
| 2018/0248896 A1 | 8/2018 | Challita et al. |
| 2018/0262348 A1 | 9/2018 | Golshan et al. |
| 2018/0324204 A1 | 11/2018 | McClory et al. |
| 2019/0200282 A1 | 6/2019 | Sahin et al. |
| 2019/0327268 A1* | 10/2019 | Goutal .................. H04L 63/101 |
| 2020/0128022 A1 | 4/2020 | Bleikertz et al. |
| 2020/0311265 A1* | 10/2020 | Jones .................. H04L 63/1483 |
| 2020/0372040 A1 | 11/2020 | Boehmann et al. |
| 2021/0099485 A1* | 4/2021 | Lancioni ............. H04L 63/1466 |
| 2021/0144174 A1* | 5/2021 | N ........................ H04L 63/1433 |
| 2021/0367976 A1 | 11/2021 | Khurshid et al. |

FOREIGN PATENT DOCUMENTS

| | | | |
|---|---|---|---|
| JP | 201284141 A | 4/2012 | |
| KR | 101622874 B1 | 5/2016 | |
| WO | 2005/069823 A2 | 8/2005 | |
| WO | WO-2009111224 A1 * | 9/2009 | ............. G06F 21/55 |
| WO | 2014/093613 A1 | 6/2014 | |

OTHER PUBLICATIONS

"Data Loss Prevention and Monitoring in the Cloud" by netSkope, Inc., Nov. 2014, 18 pgs.

"Repave the Cloud-Data Breach Collision Course," netSkope, Inc., 2014, 6 pgs.

"Netskope Cloud Confidence Index™", netSkope, Inc., 2015, 4 pages.

"The 5 Steps to Cloud Confidence", netSkope, Inc., 2014, 11 pages.

"Netskope Active Cloud DLP," netSkope, Inc., 2015, 4 pgs.

Screen capture of https://www.bitglass.com/blog/how-topatent-a-phishing-attack, dated Oct. 1, 2015.

PTAB Case No. PGR2021-00091, Petition for Post-Grant Review of U.S. Pat. No. 10,855,671, *Netskope, Inc.*, Petitioner, v. *Bitglass, Inc.*, Patent Owner.

PTAB Case No. PGR2021-00092, Petition for Post-Grant Review of U.S. Pat. No. 10,855,671, *Netskope, Inc.*, Petitioner, v. *Bitglass, Inc.*, Patent Owner.

Jill Gemmill et al., Cross-domain authorization for feder-ated virtual organizations using the myVocs collaboration environment, 21 Concurrency & Computation: Prac-Tice and Experience 509 (2008).

PTAB Case No. IPR2021-01045, Petition for Inter Partes Review of U.S. Pat. No. 10,757,090, *Netskope, Inc.*, Petitioner, v. *Bitglass, Inc.*, Patent Owner.

PTAB Case No. IPR2021-01046, Petition for Inter Partes Review of U.S. Pat. No. 10,757,090, *Netskope, Inc.*, Petitioner, v. *Bitglass, Inc.*, Patent Owner.

"Cloud Data Loss Prevention Reference Architecture", Netskope, Sep. 2015, WP-88-1, 2 pages.

"Data Breach: The Cloud Multiplier Effect", Ponemon Institute, Jun. 4, 2014, 27 pages.

"Netskope Introspection," netSkope, Inc., 2015, 3 pgs.

"Netskope The 15 Critical CASB Use Cases", Netskope Inc., EB-141-1, dated 2015, 19 pages.

"The Netskope Active Platform Enabling Safe Migration to the Cloud", Apr. 2015, DS-1-8, Netskope, Inc., 6 pages.

"The Netskope Advantage: Three "Must-Have" Requirements for Cloud Access Security Brokers", Jul. 2015, WP-12-2 1 pages.

Anonymous, Installing Box Sync, Box, retrieved on Feb. 6, 2019, 13 pages. Retrieved from the internet [URL: hllps://community.box.com/t5/Using-Box-Sync/Installing-Box-Sync/ta-p/85].

Daigneau, Service Design Patterns—Fundamental Design Solutions for SOAP/WSDL and RESTful Web Services, Derason Education, dated 2012, 60 pages.

EP 14761047.1—Extended Search Report dated Aug. 4, 2016, 7 pages {NSKO 1000-5 EP).

EP 14761047.1—Notice of Allowance dated Jun. 1, 2018, 45 pages (NSKO 1000-5 EP).

EP 14761047.1—Response to Extended Search Report dated Aug. 4, 2016 filed Feb. 28, 2017, 10 pages NSKO 1000-5 EP).

EP 18199916.0—Extended European Search Report dated Feb. 14, 2019, 8 pages {NSKO-1000-10).

EP 18199916.0—Response to Extended European Search Report dated Feb. 14, 2019, as filed Sep. 20, 2019, 12 pages {NSKO-1000-10).

Kark et al., "Trends: Calculating the Cost of a Security Breach", Forrester Research, Inc. Apr. 10, 2007, 7 pgs.

Liu et al., Data Loss Prevention, IT Professional, vol. 12, Issue 2, IEEE, Mar. 29, 2010, pp. 10-13.

Masse, Rest API—Design Rulebook, O'Reilly publication, dated 2012, 114 pages.

Netskope, "Data Loss Prevention and Monitoring in the Cloud", Nov. 2014, 18 pages, {NSKO 1006 2).

Netskope, "The 5 Steps to Cloud Confidence", Version 2, Jan. 29, 2014, 10 pages.

Netskope, "The 5 Steps to Cloud Confidence," netSkope Inc., 2014, 11 pgs.

Nllamaraju, RESTful Web Services Cookbook, O'Reilly Publication, dated Mar. 2010, 314 pages.

Oasis, Key Management Interoperability Protocols Use Cases Version 1.2, dated Mar. 18, 2013, 132 pages.

Pandire et al., Attack Detection in Cloud Virtual Environment and Prevention using Honeypot, International Conference in Inventive Research in Computing Applications {ICIRCA), IEEE, Jul. 11-12, 2018, pp. 515-520.

Park et al., Derwent translation of KR 101622874 B1; May 19, 2016, 35 pages. (Year: 2016).

(56) References Cited

OTHER PUBLICATIONS

PCT/US2014/21174—International Preliminary Report on Patentability, dated Sep. 8, 2015, 10 pages {NSKO 1000-4).
PCT/US2014/21174—International Search Report and Written Opinion, dated Aug. 29, 2014, 13 pages {NSKO 1000-4).
Richardson et al., RESTful Web APIs, O'Reilly Publication, dated Sep. 2013, 404 pages.
Richardson et al., RESTful Web Services, O'Reilly Publication, dated May 2007, 448 pages.
Zhu, Xiaojin Jerry. "Semi-supervised learning literature survey." (2005). (Year: 2005), 39 pages.
EP 19727564.7 Rules 161(1) and 162 Communication, dated Jan. 15, 2021, 3 pages. (NSKO 1019-6), Jan. 15, 2021.
Eastlake, D., "RFC-6066-Standard", Internet Engineering Task Force (IETF), Jan. 2011, 25 pages. (NSKO I007-1), Jan. 2011.
Khanuja Harmeet et al: "Role of metadata in forensic analysis of database attack", 2014 IEEE International Advance Computing Conference (IACC), IEEE, Feb. 21, 2014 (Feb. 21, 2014), pp. 457-462., Feb. 21, 2014.
U.S. Appl. No. 15/958,672—Notice of Allowance dated Feb. 24, 2020, 26 pages {NSKO 1007-2)., dated Feb. 24, 2020.
U.S. Appl. No. 15/958,637—Preinterview First Office Action dated Mar. 2, 2020, (NSKO I 008-1). 7 pages, dated Mar. 2, 2020.
U.S. Appl. No. 15/958,637—Response to Preinterview First Office Action dated Mar. 2, 2020, filed Apr. 2, 2020, (NSKO 1008-1). 19 pages, dated Apr. 10, 2020.
Wikipedia, "Traffic Server", [retrieved on Apr. 13, 2018]. Retrieved from the Internet <URL: https://en.wikipedia.org/wiki/Traffic_Server> (NSKO 1008-1), 1 page, Apr. 13, 2018.
Wikipedia, "HTTPS", [retrieved on Apr. 17, 2018]. Retrpieved from the Internet <URL: <https://en.wikipedia.org/w/index.php?title=HTTP S&oldid=836835625>. (NSKO 1007-2) 8 pages, Apr. 17, 2018.
Wikipedia, "List of HTTP header fields", [retrieved on Apr. 17, 2018]. Retrieved from the Internet <URL: <"https://en.wikipedia.org/w/index.php?title=List_of HTTP header fields&oldid=83686420"2>. 7 pages—(NSKO 1007-2), Apr. 17, 2018.
JP 2019-081108 Response to First Office Action dated May 18, 2021, filed Sep. 21, 2021, 13 pages (NSKO 1003-9)., May 18, 2021.
Symantec, Symantec Data Loss Prevention for Endpoint, dated May 2011, 3 pages, May 2011.
McAfee, McAfee Data Loss Prevention Endpoint, dated May 2017, 3 pages, May 2017.
U.S. Appl. No. 15/958,672—Notice of Allowance dated Jun. 9, 2020, 25 pages (NSKO 1007-2)., Jun. 9, 2020.
U.S. Appl. No. 15/958,637—Notice of Allowance dated Jun. 17, 2020, 10 pages (NSKO 1008-1)., Jun. 17, 2020.
Blake-Wilson, S., et al., "RFC-3546-Standard", Network Working Group, The Internet Society, Jun. 2003, 29pgs. (NSKO 1007-2), Jun. 2003.
Fielding, R, "Hypertext Transfer Protocol (HTTP/1.1): Message Syntax and Routing", Internet Engineering Task Force, Jun. 2014, 89 pages. (NSKO 1007-2), Jun. 2014.
Fielding, R., "Hypertext Transfer Protocol (HTTP/1.I): Semantics and Content", Internet Engineering Task Force, Jun. 2014, 101 pages. (NSKO 1007-2), Jun. 2014.
U.S. Appl. No. 16/411,039—Response to Office Action dated Feb. 10, 2021, filed Jul. 9, 2021, 18 pages {NSKO 1029-1)., Jul. 9, 2021.
European Search Report issued in EP Application No. 21191734.9, dated Jul. 12, 2022, 7 pages, Jul. 12, 2022.
EP 19727564.7 Response to Rules 161(1) and 162 Communication dated Jan. 15, 2021, filed Jul. 26, 2021, 12 pages. (NSKO 1019-6), dated Jul. 26, 2021.
EP 17713822.9 Decision to Grant, dated Aug. 1, 2019, 2 pages (NSKO 1003-7)., dated Aug. 1, 2019.
Heckel, "Use SSLsplit to transparently sniff TLS/SSL connections—including non-HTTP(S) protocols", Blog post Aug. 4, 2013, 28 pages (NSKO 1008-1)., Aug. 4, 2013.
EP 19189235.5 Certificate of Grant, dated Aug. 31, 2021, 1 pages. (NSKO 1003-10).
U.S. Appl. No. 16/408,215 Preinterview First Office Action dated Sep. 23, 2021, 21 pgs. (NSKO 1019-2), dated Sep. 23, 2021.
U.S. Appl. No. 16/411,039—Office Action dated Oct. 21, 2021, 37 pages (NSKO 1029-1)., dated Oct. 21, 2021.
U.S. Appl. No. 16/738,964—Notice of Allowance dated Oct. 23, 2020, 38 pages (NSKO 1007-3)., dated Oct. 23, 2020.
JP 2019-081108 Notice of Allowance, dated Oct. 26, 2021, 5 pages. (NSKO 1003-9), dated Oct. 26, 2021.
Bremler-Barr, Anat Et Al:"Deep Packet Inspection as a Service", Proceedings of The 10th ACM International on Conference on Emerging Networking Experiments and Technologies, CONEXT '14, ACM Press, New York, NY, USA, Dec. 2, 2014 (Dec. 2, 2014), pp. 271-282., Dec. 2, 2014.
Li el. al., Security Intelligence—A Practitioner's Guide to Solving Enterprise Security Challenges, Wiley, dated 2015, 363 pages, 2015.

* cited by examiner

FIG. 7

METADATA-BASED DETECTION AND PREVENTION OF PHISHING ATTACKS

PRIORITY DATA

This application claims the benefit of and priority to Provisional Patent Application No. 62/966,412, titled "METADATA-BASED DETECTION AND PREVENTION OF PHISHING ATTACKS," filed on Jan. 27, 2020. The provisional application is incorporated by reference as if fully set forth herein.

INCORPORATIONS

The following materials are incorporated by reference as if fully set forth herein:
U.S. Provisional Patent Application No. 62/307,305, titled "Systems And Methods Of Enforcing Multi-Part Policies On Data-Deficient Transactions Of Cloud Computing Services," filed on Mar. 11, 2016;
U.S. Nonprovisional patent application Ser. No. 16/000,132, titled "Metadata-Based Data Loss Prevention (DLP) For Cloud Storage," filed on Jun. 5, 2018 (now U.S. Pat. No. 10,291,657 issued on May 14, 2019);
U.S. Nonprovisional patent application Ser. No. 15/368,240, titled "Systems And Methods Of Enforcing Multi-Part Policies On Data-Deficient Transactions Of Cloud Computing Services," filed on Dec. 2, 2016;
U.S. Nonprovisional patent application Ser. No. 15/368,246, titled "Middle Ware Security Layer For Cloud Computing Services," filed on Dec. 2, 2016;
Cheng, Ithal, Narayanaswamy, and Malmskog. *Cloud Security For Dummies, Netskope Special Edition*. John Wiley & Sons, Inc. 2015;
U.S. Nonprovisional patent application Ser. No. 14/198,499, titled "Security For Network Delivered Services," filed on Mar. 5, 2014 (now U.S. Pat. No. 9,398,102 issued on Jul. 19, 2016);
U.S. Nonprovisional patent application Ser. No. 14/835,640, titled "Systems And Methods Of Monitoring And Controlling Enterprise Information Stored On A Cloud Computing Service (CCS)," filed on Aug. 25, 2015 (now U.S. Pat. No. 9,928,377 issued on Mar. 27, 2018);
U.S. Nonprovisional patent application Ser. No. 15/911,034, titled "Simulation And Visualization Of Malware Spread In A Cloud-Based Collaboration Environment," filed on Mar. 2, 2018;
U.S. Nonprovisional patent application Ser. No. 15/986,732, titled "Data Loss Prevention Using Category-Directed Parsers," filed on May 22, 2018;
U.S. Provisional Patent Application No. 62/488,703, titled "Reducing Latency And Error In Security Enforcement By A Network Security System (NSS)," filed on Apr. 21, 2017;
U.S. Nonprovisional patent application Ser. No. 16/118,278, titled "Enriching Document Metadata Using Contextual Information," filed on Aug. 30, 2018;
"Data Loss Prevention and Monitoring in the Cloud" by netSkope, Inc.;
"The 5 Steps to Cloud Confidence" by netSkope, Inc.;
"Netskope Active Cloud DLP" by netSkope, Inc.;
"Repave the Cloud-Data Breach Collision Course" by netSkope, Inc.; and
"NETSKOPE CLOUD CONFIDENCE INDEX™" by netSkope, Inc.

FIELD OF THE TECHNOLOGY DISCLOSED

The technology disclosed relates to securing network traffic to and from hosted services and, in particular, relates to using metadata to detect and prevent phishing attacks that attempt to exfiltrate data from the hosted services.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Phishing is an attempt from phishers to elicit confidential information of users by using fake websites. Phishers want to get access to private account information and passwords. A successful phishing attack can have disastrous consequences for the victims leading to financial losses and data theft. Usually, phishers send fraudulent emails or chat messages with a link and the lure to click on it. There is a multitude of different phishing attacks like spear phishing, where phishers want to increase their success rate by sending e-mails to specific companies with individual matched content. Another type of phishing is called clone phishing, where phishers clone a previously sent message and replace the legitimate content with malicious information like links or formulas.

The ability to access cloud services from anywhere makes the potential for a successful phishing-based compromise easier. 25% of phishing attacks bypass default security measures built into Office 365, a prominent cloud service which is the most-impersonated brand in phishing attacks.

Cloud-based email has rung in a new era of phishing. The connected nature of cloud-based email allows phishers to get access to a bigger bounty from a single successful phishing attack since the credentials give them access to other connected accounts.

Impersonation phishing attacks involve placing a link to a phishing web page that prompts employees to log in; however, the users are actually sacrificing their credentials to phishers instead of logging in. From there, when the unsuspecting victims click on the link and are directed to a false sign-in page, they provide phishers with their usernames and password without knowing they had done anything out of the ordinary.

After stealing the credentials, the phishers typically use them to remotely log into the user's Office 365 account or other email accounts and use this as a launching point for other spear phishing attacks. At this point, it becomes even more difficult to detect phishers at work because they send additional phishing emails to other employees or external partners, trying to entice those recipients to click on a phishing link.

Impersonation phishing attacks are challenging to detect for several reasons. Phishing links are typically zero-day where a unique link is sent to each recipient, and therefore they never appear on any security blacklists. In many cases, the phishing links lead to a legitimate website, where the attacker has maliciously inserted a sign-in page, and the domain and IP reputation are legitimate. Link protection technologies such as safe links do not protect against these phishing links. Since the phishing link just contains a sign-in page and does not download any malicious viruses, the user follows the safe link and still enters the username and password.

Therefore, effective protection against phishing is needed.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 7 shows that the phishing webpage of FIG. 6 has a valid domain and certificate.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Figure 1:
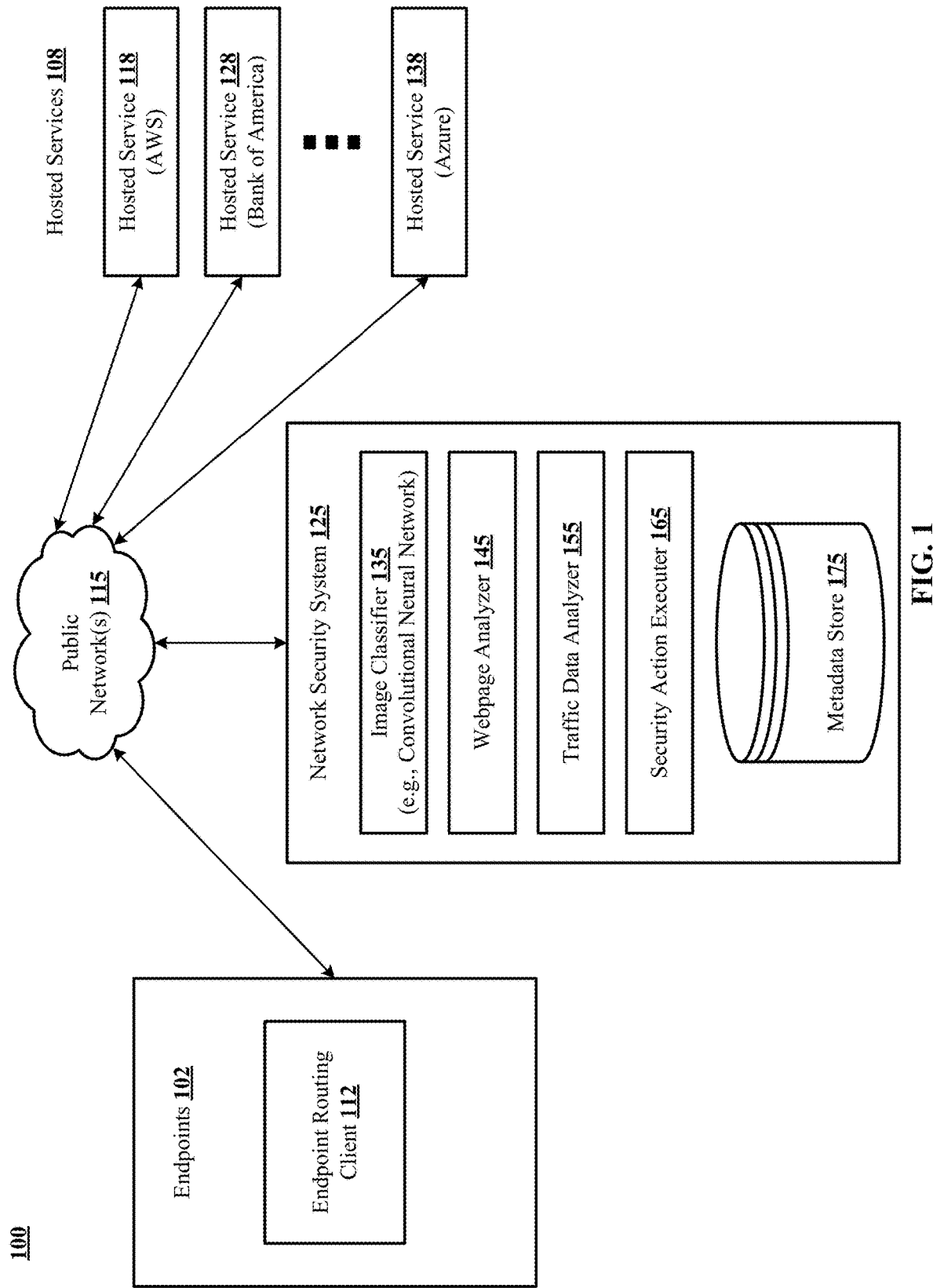
FIG. 1 shows one implementation of detecting and preventing phishing attacks using a network security system.

We describe a system and various implementations for detecting and preventing phishing attacks. The system and processes are described with reference to FIG. 1. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements is described in greater detail.

FIG. 1 illustrates one implementation of the technology disclosed operating in an environment 100. The environment 100 includes endpoints 102, the network security system 125, and hosted services 108. Endpoints 102 access contents (e.g., documents) stored in the hosted services 108 via the network security system 125. Endpoints 102 comprise an endpoint routing client 112.

The network security system 125 includes an image classifier 135 (e.g., convolutional neural network), a webpage analyzer 145, a traffic data analyzer 155, a security action executer 165, and a metadata store 175.

The modules of the endpoints 102 and the network security system 125 can be implemented in hardware or software, and need not be divided up in precisely the same blocks as shown in FIG. 1. Some of the modules can also be implemented on different processors or computers, or spread among a number of different processors or computers. In addition, it will be appreciated that some of the modules can be combined, operated in parallel or in a different sequence than that shown in FIG. 1 without affecting the functions achieved. Also, as used herein, the term "module" can include "sub-modules," which themselves can be considered to constitute modules. The blocks in the endpoints 102 and the network security system 125, designated as modules, can also be thought of as flowchart steps in a method. A module also need not necessarily have all its code disposed contiguously in memory; some parts of the code can be separated from other parts of the code with code from other modules or other functions disposed in between.

The interconnections of the elements of environment 100 are now described. The public network(s) 115 couples the endpoints 102, the network security system 125, and the hosted services 108, all in communication with each other (indicated by solid double-arrowed lines). The actual communication path can be point-to-point over public and/or private networks. Some items, such as the endpoint routing client 112, might be delivered indirectly, e.g., via an application store (not shown). The communications can occur over a variety of networks, e.g., private networks, VPN (Virtual Private Network), MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

Endpoints 102 can be desktop computers, laptops, tablet computers, mobile phones, or any other type of computing devices. The engines or system components of environment 100 such as the network security system 125 are implemented by software running on varying types of computing devices. Example devices are a workstation, a server, a computing cluster, a blade server, and a server farm.

Having introduced the elements of FIG. 1 and their interconnections, elements of the figure are now described in greater detail.

In FIG. 1, three hosted services AMAZON WEB SERVICES (AWS)™ 118, BANK OF AMERICA™ 128, and MICROSOFT AZURE™ 138 are shown, however, it is understood that environment 100 can include any number of hosted services. Hosted services 108 can be cloud computing and storage services, financial services, e-commerce services, or any type of applications, websites, or platforms. Often, hosted services 108 are the most-commonly used cloud applications such as BOX™, DROPBOX™, AMAZON AWS™, GOOGLE DRIVE™ GOOGLE CLOUD PLATFORM (GCP)™, MICROSOFT AZURE™, EVERNOTE™, and so on. Hosted services can be referred to as cloud services, cloud applications, cloud storage applications (services), and cloud computing applications (services).

Hosted services 108 provide functionality to users that can be implemented in the cloud and that can be the target of data loss prevention (DLP) policies, e.g., logging in, editing documents, downloading bulk data, reading customer contact information, entering payables, and deleting documents. Hosted services 108 can be a network service or application, or can be web-based (e.g., accessed via a URL) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common hosted services today include BOX™, GOOGLE DRIVE™, SALESFORCE.COM™, DROPBOX™, MICROSOFT ONEDRIVE 365™, APPLE ICLOUD DRIVE™, ORACLE ON DEMAND™, SUGARSYNC™, IDRIVE™, and SPIDEROAK ONE™.

Sanctioned hosted services are those hosted services that the company provides for employee use and of which IT is aware. IT usually has full administrative control over these hosted services and maintains them on behalf of the business. Even though IT may manage sanctioned hosted services, the department still may lack specific knowledge about how users are accessing these hosted services and what activities they are performing, including uploading, downloading, sharing, or editing corporate data.

Unsanctioned hosted services are those hosted services that the company does not know about. Very often, if IT does not provide the necessary tools to accomplish a needed business function, employees go outside of IT and procure their own hosted services. Employees can easily find, pay for, download, and administer these hosted services without IT's knowledge or assistance. On the one hand, this is a good thing because it gives employees a way to work efficiently. On the other hand, these unsanctioned hosted services create risk for IT. Keeping hosted services and the data within them secure is challenging when IT does not know about them. IT cannot properly enforce security or compliance in unsanctioned hosted services. Without important security features, such as strong user authentication and audit logging, these hosted services and the data within them are vulnerable to inadvertent or intentional data exposure. Finally, IT has no idea how users are using unsanctioned hosted services.

Hosted services 108 can also be determined/identified/graded based on NETSKOPE CLOUD CONFIDENCE INDEX™ that assesses a hosted service's enterprise-readiness based on objective criteria and assigns an overall score. In particular, NETSKOPE CLOUD CONFIDENCE INDEX™ measures the enterprise readiness of hosted services by taking into various attributes of the hosted services. The following list of hosted service attribute is exemplary rather than exhaustive and includes: encryption policies, auditability and business continuity, disaster management policies, number of data centers, compliance certifications (e.g. SOC2) of the data centers, identity and access control, file sharing, data classification, audit and alert, data access logs preservation, password policy, forfeiture policies, published data recovery plan, and ability to proxy traffic for inspection and security controls.

In some implementations, NETSKOPE CLOUD CONFIDENCE INDEX™ assigns a score between 0 and 100 to each hosted service that interfaces with an organization's network. Further, based on the assigned score, the hosted services can be categorized into different cloud confidence levels such as excellent, high, medium, low, or poor.

In other implementations, NETSKOPE CLOUD CONFIDENCE INDEX™ groups the hosted services into a plurality of categories, including cloud storage, collaboration, finance and accounting, customer relationship management (CRM), human resources, and software development.

Hosted services 108 publish their application programming interfaces (APIs) to allow a third party to communicate with them and utilize their underlying data. An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code-based application intended to be used as an interface by software components to communicate with each other. An API can include applications for routines, data structures, object classes, and variables. Basically, an API provides an interface for developers and programmers to access the underlying data, platform capabilities, and features of hosted services. Implementations of the technology disclosed use different types of APIs, including web service APIs such as HTTP or HTTPs based APIs like SOAP, WSDL, Bulk, XML-RPC and JSON-RPC and REST APIs (e.g., FLICKR™, GOOGLE STATIC MAPS™, GOOGLE GEOLOCATION™), web socket APIs, library-based APIs like JavaScript and TWAIN (e.g., GOOGLE MAPS™ Javascript API, DROPBOX™ JavaScript Data store API, TWILIO™ APIs, Oracle Call Interface (OCI)), class-based APIs like Java API and Android API (e.g., GOOGLE MAPS™ Android API, MSDN Class Library for .NET Framework, TWILIO™ APIs for Java and C #), OS functions and routines like access to file system and access to user interface, object remoting APIs like CORBA and .NET Remoting, and hardware APIs like video acceleration, hard disk drives, and PCI buses. Other examples of APIs used by the technology disclosed include AMAZON EC2 API™, BOX CONTENT API™, BOX EVENTS API™, MICROSOFT GRAPH™, DROPBOX API™, DROPBOX API v2™, DROPBOX CORE API™, DROPBOX CORE API v2™, FACEBOOK GRAPH API™, FOURSQUARE API™, GEONAMES API™ FORCE.COM API™, FORCE.COM METADATA API™, APEX API™, VISUALFORCE API™, FORCE.COM ENTERPRISE WSDL™, SALESFORCE.COM STREAMING API™ SALESFORCE.COM TOOLING API™, GOOGLE DRIVE API™, DRIVE REST API™ ACCUWEATHER API™, and aggregated-single API like CLOUDRAIL™ API.

Having described the hosted services 108 and their APIs, the discussion now turns to the network security system 125.

The network security system 125 provides a variety of functionalities, including using the image classifier 135 to analyze one or more images of a webpage and determine that a particular hosted service is represented by the images, using the webpage analyzer 145 to analyze one or more fields of the webpage and determine that the fields elicit confidential information, using the traffic data analyzer 155 to analyze a request (e.g., HTTP request) and determine that the confidential information is being exfiltrated to an unsanctioned resource by comparing a resource address in the request with one or more sanctioned resource addresses used by the particular hosted service, using the metadata store 175 to store/list/identify the sanctioned resource addresses, and using the security action executer 165 to block transmission of the confidential information to the unsanctioned resource. These functionalities collectively prevent phishers from maliciously accessing the hosted services 108 via the endpoints 102. More generally, the network security system 125 provides application visibility and control functions as well as security.

The image classifier 135 can implement any image classification algorithm such as convolutional neural networks, state vector machines, random forests, and gradient boosted decision trees. The image classifier 135 can be trained to map webpage images to hosted services 108 using back-propagation-based stochastic gradient update training techniques (e.g., by using the ADAM training algorithm).

The webpage analyzer 145 parses and analyzes an HTML document, a PDF, an image, a JavaScript code, a data storage layer (e.g., local Storage, IndexedDB, WebSQL, FileSystem), or some other type of content (e.g., cascading style sheets (CSS)). In one implementation, the webpage analyzer 145 parses the HTML document and converts elements to DOM nodes in a content tree. In another implementation, it parses and analyzes the already generated content tree. In one implementation, it parses and analyzes style data, both in external CSS files and in style elements. In another implementation, it parses and analyzes a render tree that contains styling information together with visual instructions in the HTML document. In some implementations, the parsing also includes lexical analysis and syntax analysis of the text and fields (key-value pairs) of the HTML document.

The traffic data analyzer 155 parses and analyzes Hypertext Transfer Protocol (HTTP) requests such as GET requests, POST requests, and HEAD requests. The HTTP requests include general headers (connection, date), request/response headers, and entity headers (content-length, content-type, last-modified). In one implementation, the traffic data analyzer 155 parses and analyzes the HTTP headers in the POST requests. In one implementation, the traffic data analyzer 155 uses connectors or standardized integrations to interpret the HTTP transactions using deep API inspection (DAPII).

The security action executer 165 executes security actions, including block, alert, bypass, quarantine, coach, initiate a workflow to remediate, record, seek justification, report on the out-of-compliance event or activity, or content encryption. The type of the security action can be based on at least one of the type of the content policies, the content-level activity being performed, and the content-type. In other implementations, certain off-line inspections can be triggered as security actions, such as changing the ownership of sensitive data.

For further information regarding the functionalities of the network security system 125, reference can be made to, for example, commonly owned U.S. patent application Ser. Nos. 14/198,499; 14/198,508; 14/835,640; 14/835,632; and 62/307,305; Cheng, Ithal, Narayanaswamy, and Malmskog. *Cloud Security For Dummies, Netskope Special Edition*. John Wiley & Sons, Inc. 2015; "Netskope Introspection" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud Confidence*" by Netskope, Inc.; "*The Netskope Reactive Platform*" by Netskope, Inc.; "*The Netskope Advantage: Three "Must-Have" Requirements for Cloud Access Security Brokers*" by Netskope, Inc.; "*The 15 Critical NSS Use Cases*" by Netskope, Inc.; "*Netskope Reactive Cloud DLP*" by Netskope, Inc.; "*Repave the Cloud-Data Breach Collision Course*" by Netskope, Inc.; and "*Netskope Cloud Confidence Index*™" by Netskope, Inc., which are incorporated by reference for all purposes as if fully set forth herein.

Regarding the endpoint routing client 112, it routes network traffic emanating from the endpoints 102 to the network security system 125. Depending on the type of device, it can be a virtual private network (VPN) such as VPN on demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. Endpoint routing client 112 can also be an agent that is downloaded using e-mail or silently installed using mass deployment tools like ConfigMgr™, Altris™, and Jamf™.

Figure 2:
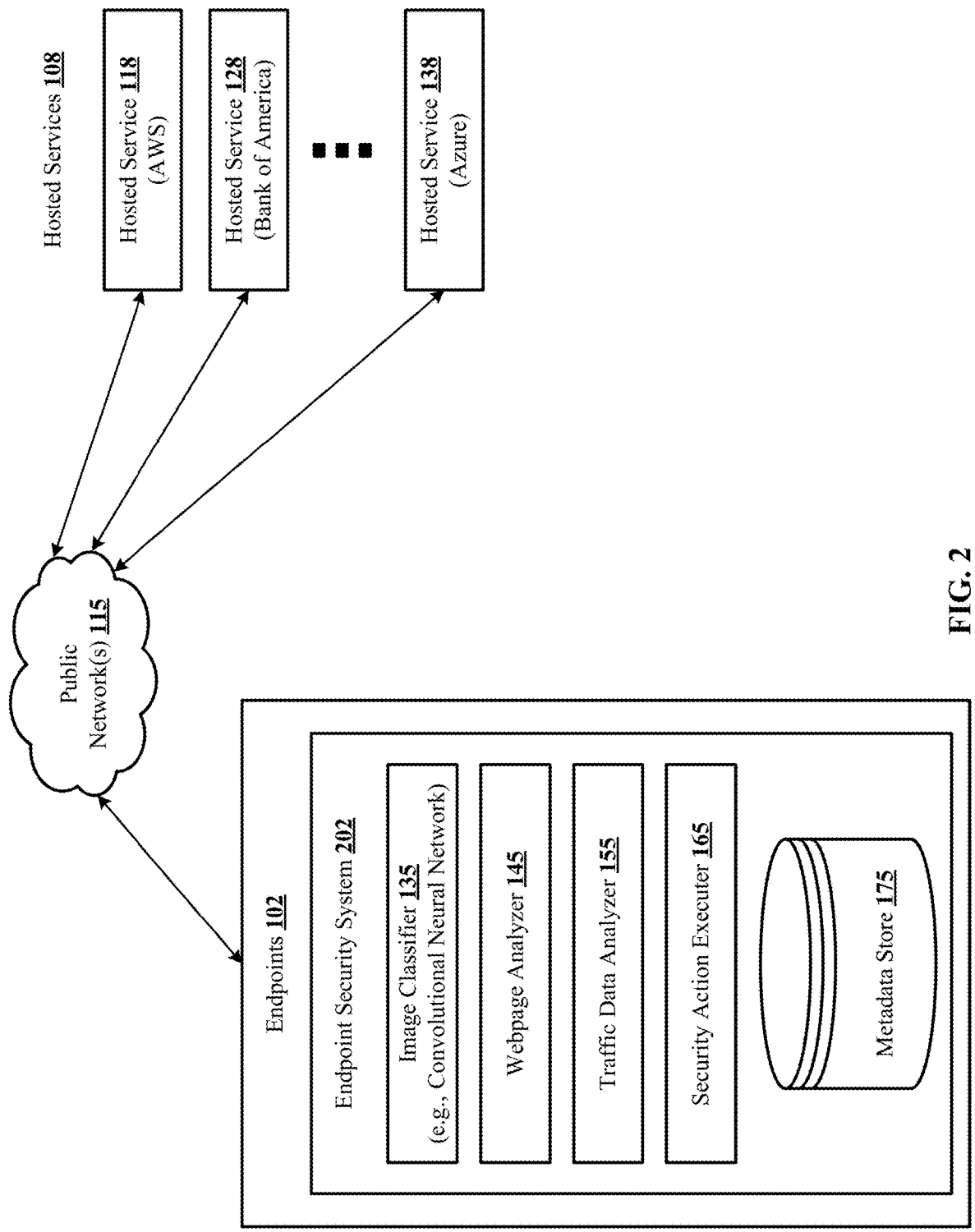
FIG. 2 shows one implementation of detecting and preventing the phishing attacks using an endpoint security system.

FIG. 2 shows one implementation of detecting and preventing the phishing attacks using an endpoint security system 202. In environment 200, the endpoints 102 are configured with the endpoint security system 202. The endpoint security system 202 comprises the image classifier 135, the webpage analyzer 145, the traffic data analyzer 155, the security action executer 165, and the metadata store 175.

The endpoint security system 202 provides a variety of functionalities, including using the image classifier 135 to analyze one or more images of a webpage and determine that a particular hosted service is represented by the images, using the webpage analyzer 145 to analyze one or more fields of the webpage and determine that the fields elicit confidential information, using the traffic data analyzer 155 to analyze a request (e.g., HTTP request) and determine that the confidential information is being exfiltrated to an unsanctioned resource by comparing a resource address in the request with one or more sanctioned resource addresses used by the particular hosted service, using the metadata store 175 to store/list/identify the sanctioned resource addresses, and using the security action executer 165 to block transmission of the confidential information to the unsanctioned resource. These functionalities collectively prevent phishers from maliciously accessing the hosted services 108 via the endpoints 102. More generally, the endpoint security system 202 provides application visibility and control functions as well as security.

Figure 3:
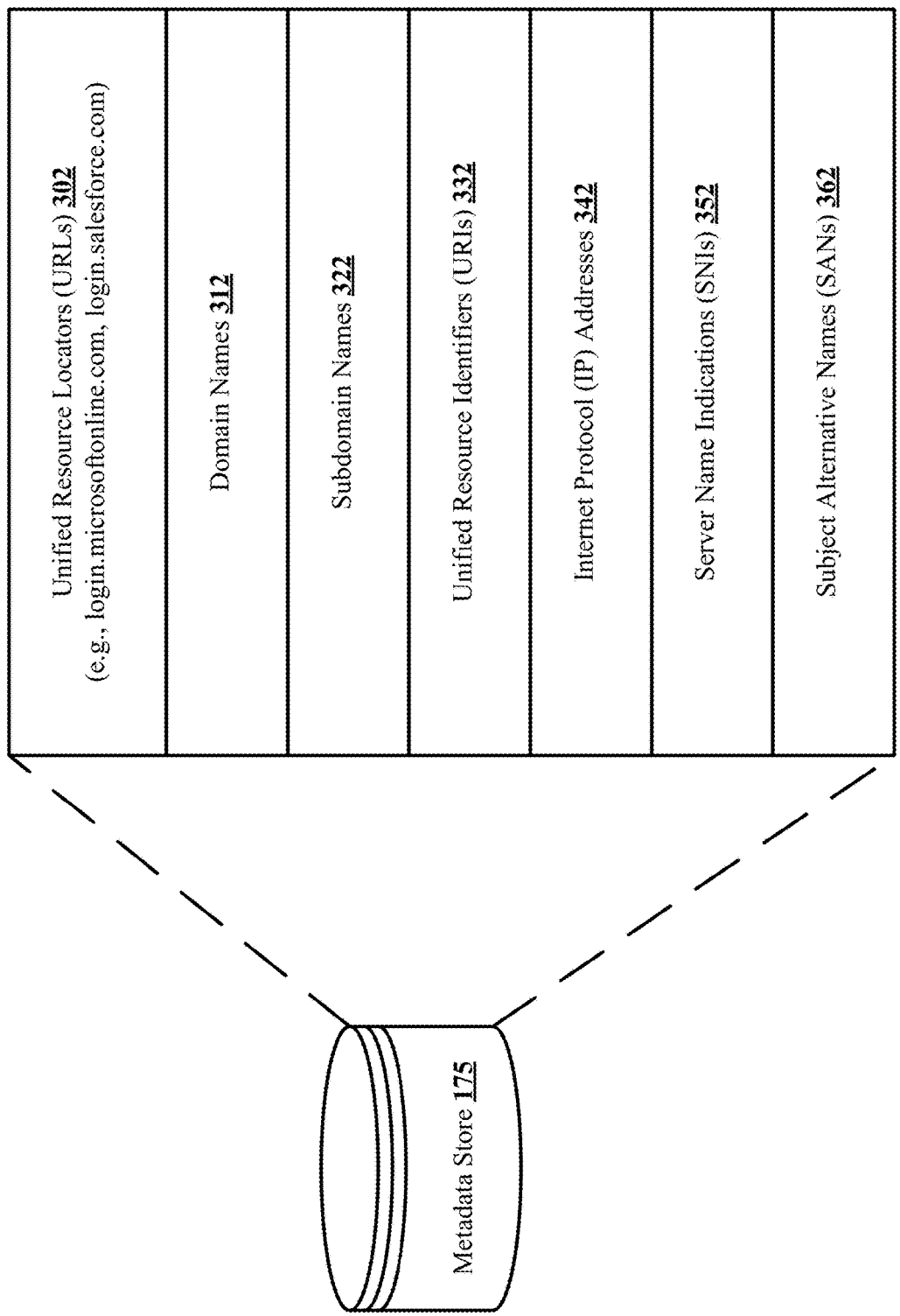
FIG. 3 illustrates one implementation of a metadata store and its contents that identify sanctioned resource addresses used by hosted services.

FIG. 3 illustrates one implementation of the metadata store 175 and its contents that identify sanctioned resource addresses used by hosted services. In one implementation, the metadata store 175 identifies/lists resource addresses of sanctioned hosted services. Examples of resource addresses include uniform resource locators (URLs) such as login.microsoftonline.com and login.salesforce.com, domain names, subdomain names, uniform resource identifiers (URIs), internet protocol (IP) addresses, server name indications (SNIs), and subject alternative names (SANs). These contents of the metadata store 175 can be referred to as "metadata."

Figure 4:
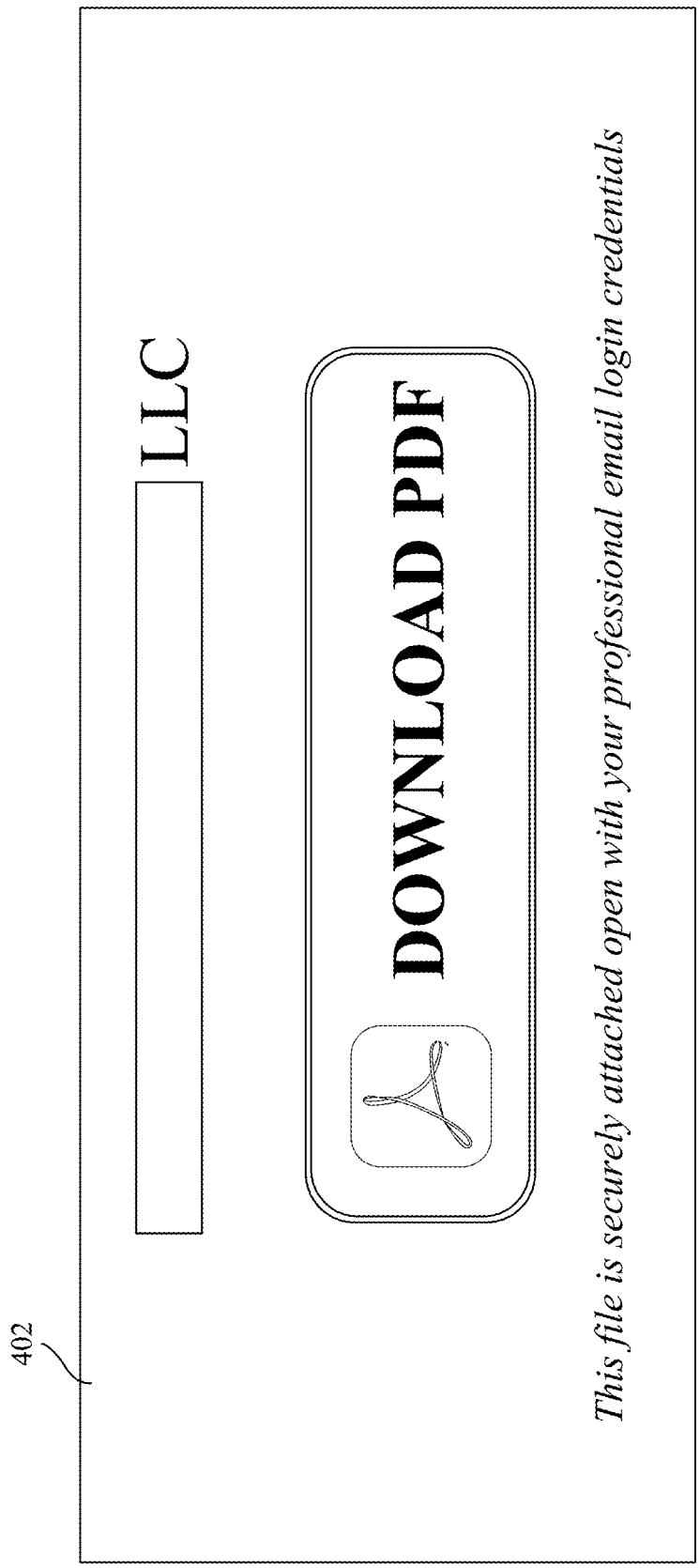
FIG. 4 depicts one example of a phishing decoy sent to a phishing victim.

FIG. 4 depicts one example of a phishing decoy 402 sent to a phishing victim. The phishing decoy 402 is a PDF hosted in the hosted service GOOGLE DRIVE™ and impersonates a law firm in Denver, Colo. (CO). The phishing decoy 402 is linked to a MICROSOFT OFFICE 365™ phishing webpage hosted in AZURE™ blob storage. Since the phishing decoy 402 is hosted in MICROSOFT AZURE™ blob storage, it has a Microsoft-issued domain and a secure sockets layer (SSL) certificate. The combination of the Microsoft-issued domain and certificate, along with the Microsoft content (webpage) make this bait particularly convincing and difficult to recognize as phishing.

The phishing decoy 402 traditionally arrives as an email attachment to phishing victims. It is crafted to contain legitimate content and comes from legitimate sources. Often, attachments are saved to cloud storage services like GOOGLE DRIVE™. Sharing these documents with other users can cause secondary propagation vector like the cloud fishing fan-out effect described in U.S. Nonprovisional patent application Ser. No. 15/911,034, which is incorporated herein.

Figure 5:
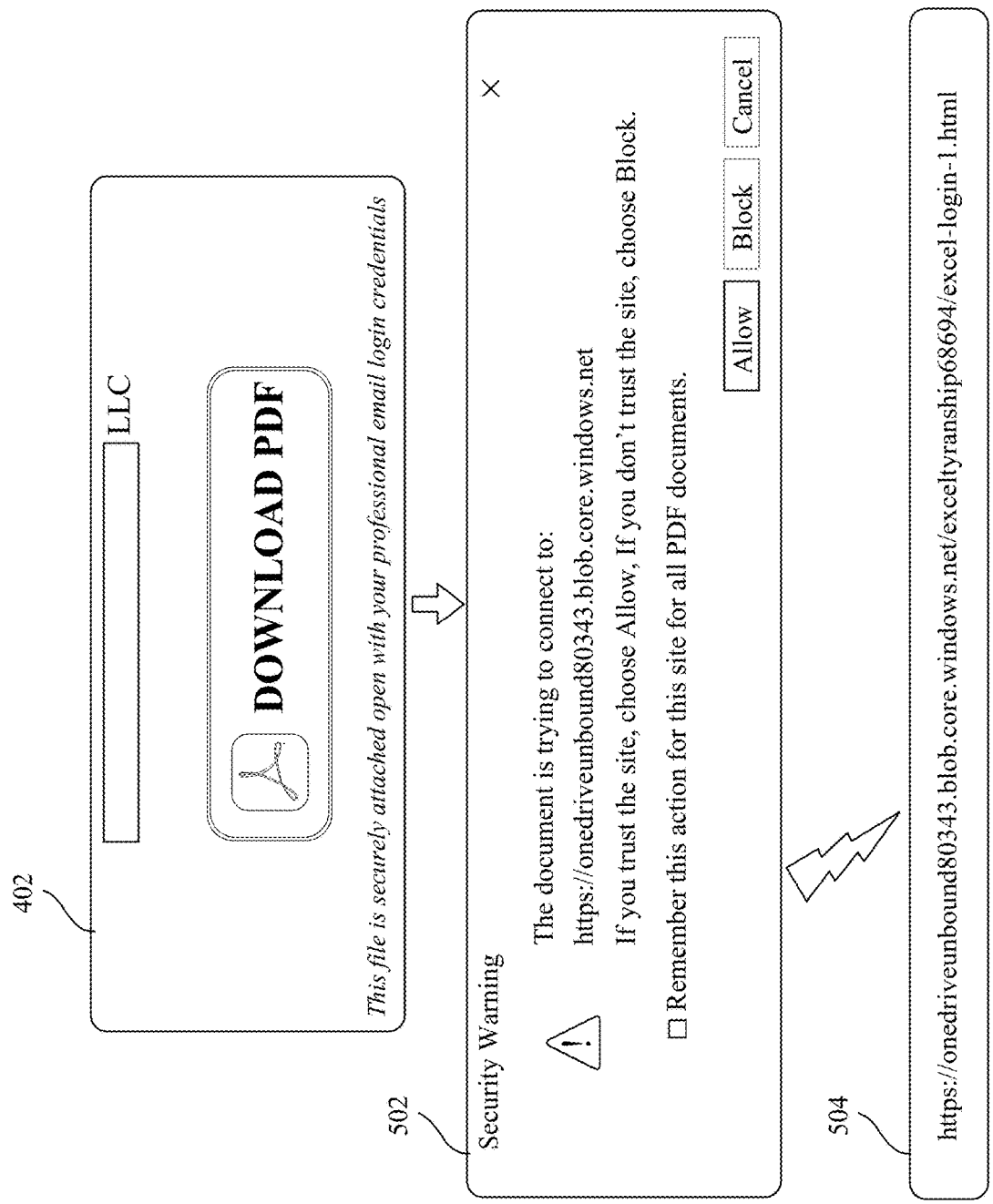
FIG. 5 shows the phishing decoy of FIG. 4 connecting to a uniform resource locator (URL) of a sanctioned cloud computing and storage service when the phishing victim clicks on the phishing decoy.

FIG. 5 shows the phishing decoy 402 of FIG. 4 connecting to a uniform resource locator (URL) 504 of a sanctioned cloud computing and storage service Azure blob storage when the phishing victim clicks on the phishing decoy 402.

The phishing decoy 402 contains a hyperlink to download the actual PDF, as shown in FIG. 4. Upon clicking the "Download PDF" hyperlink, the victim is presented with a message 502 that the document is trying to connect to the Azure blob storage URL 504.

Figure 6:
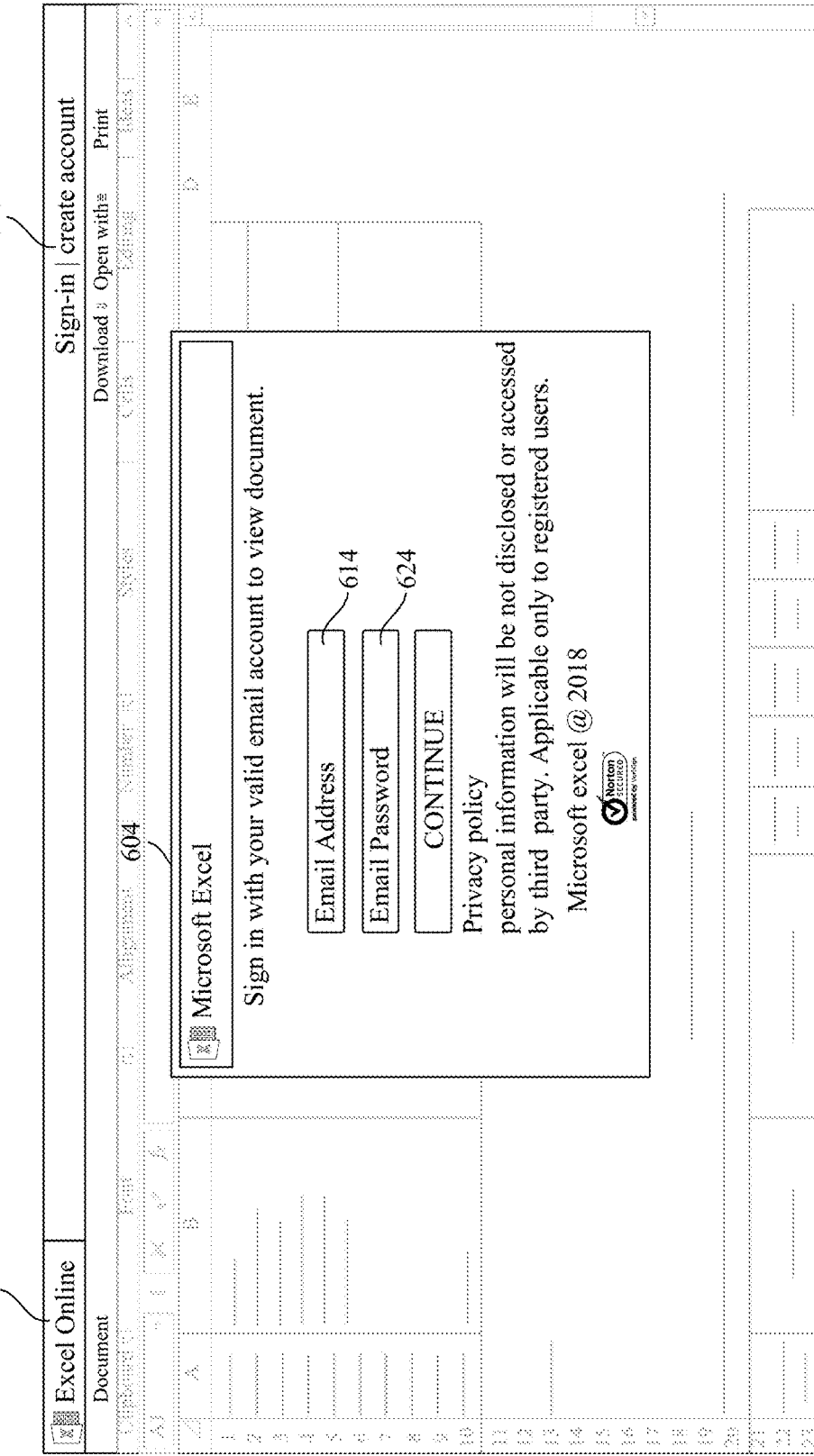
FIG. 6 illustrates a phishing webpage presented to the phishing victim in response to the phishing victim clicking the URL of the sanctioned cloud computing and storage service.

FIG. 6 shows the phishing webpage 602 that is presented to the victim after clicking the hyperlink. The phishing webpage 602 contains one or more images with image features 604 and 606 and fields 614 and 624.

Figure 7:
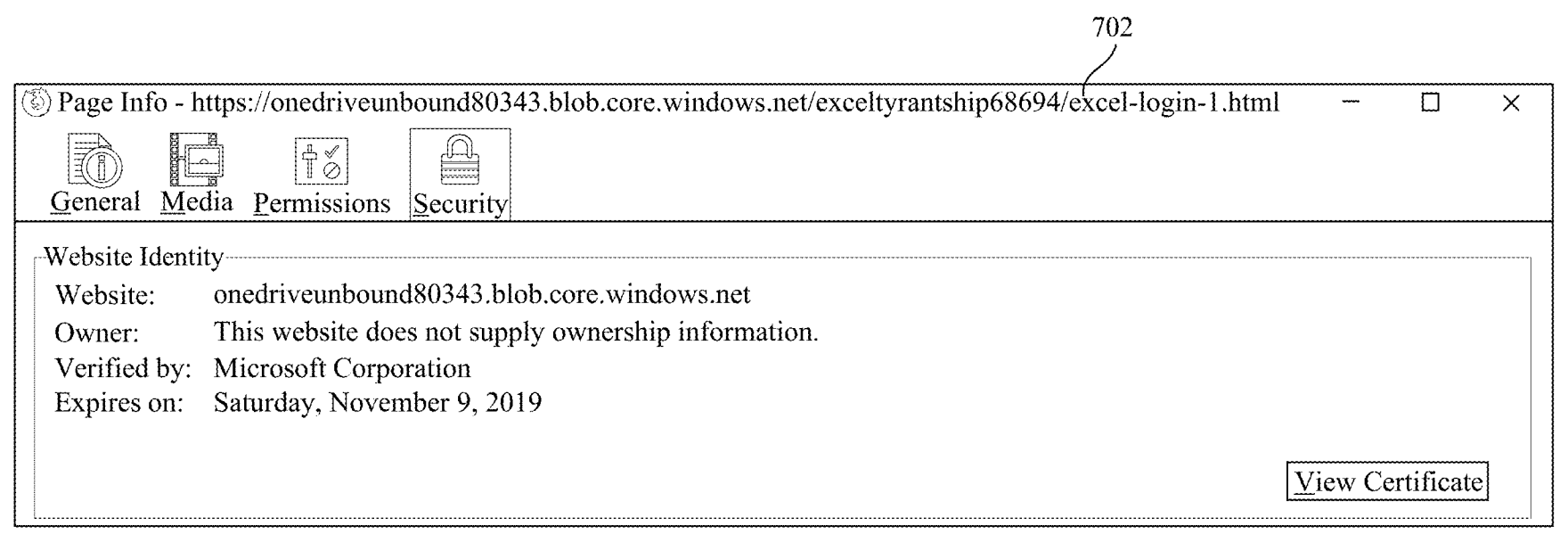
Figure 8:
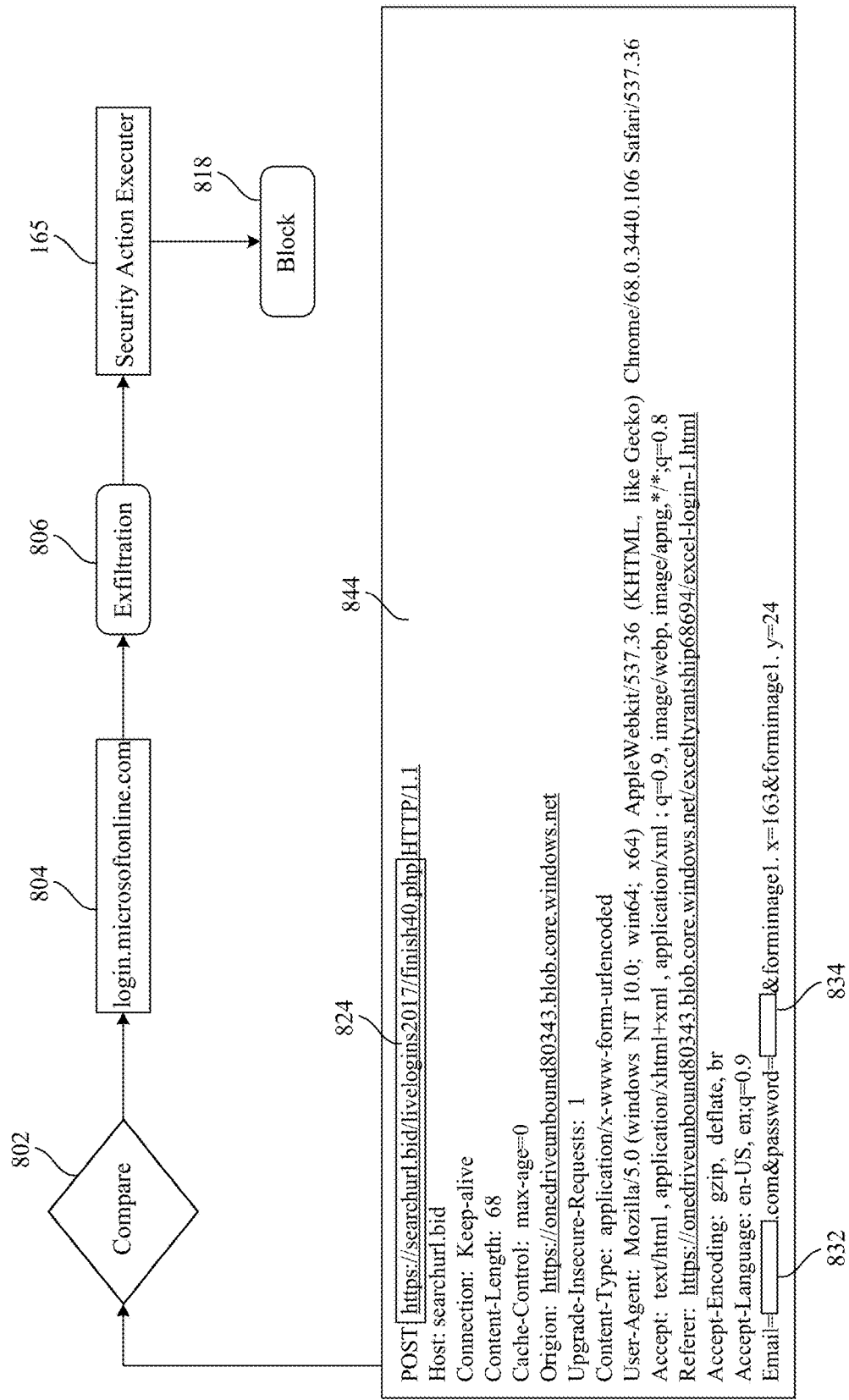
FIG. 8 depicts one implementation of preventing exfiltration of confidential information to an unsanctioned resource by comparing a resource address in a request with sanctioned resource addresses used by the hosted services and identified in the metadata store.

The phishing webpage 602 is hosted in Azure blob storage. As a result, it has a valid Microsoft-issued SSL certificate 702 and is hosted on a Microsoft-owned domain, as shown in FIG. 7. At face value, seeing a Microsoft domain and a Microsoft-issued SSL certificate 702, on a site asking for MICROSOFT OFFICE 365™ credentials is pretty strong evidence that the site is legitimate and are likely enough to convince a user to enter their credentials. Upon clicking continue, the victim's credentials are uploaded to https://searchurl.bid/livelogins2017/finish40.php 824, as shown in FIG. 8.

First, the image classifier 135 accesses the images of the phishing webpage 602 and, based on processing the image features 604 and 606, determines that the images are used by the MICROSOFT EXCEL™ application of the hosted service MICROSOFT OFFICE 365™. Therefore, the image classifier 135 predicts that the images of the phishing webpage 602 represent the hosted service MICROSOFT OFFICE 365™.

Then, the webpage analyzer 145 parses the phishing webpage 602 and analyzes the fields 614 and 624. Based on the analysis of the fields 614 and 624, the webpage analyzer 145 infers that the fields 614 and 624 are eliciting confidential information, i.e., email addresses and email password. In other implementations, different type of confidential information may be elicited and thereby detected. Some examples include controlled unclassified information (CUI), personally identifiable information (PII), protected health information (PHI), payment card industry (PCI) information, social security numbers, driver's license information, and biometric records.

The traffic data analyzer 155 then parses the HTTP header 844 and determines that the confidential information 832 and 834 is being uploaded to the URL 824 in the POST field. Then, the traffic data analyzer 155 accesses the metadata store 175 to determine which sanctioned resource addresses 804 (URLs, domain names, subdomain names, URIs, IP addresses, SNIs, SANs) are associated with the hosted service MICROSOFT OFFICE 365™. The traffic data analyzer 155 then compares 802 substrings of the URL 824 with substrings of the sanctioned resource addresses 804. If, based on the comparison 802, the traffic data analyzer 155 determines that the URL 824 is not a sanctioned resource address of the hosted service MICROSOFT OFFICE 365™. Therefore, the traffic data analyzer 155 determines that the confidential information 832 and 834 is being exfiltrated 806 to an unsanctioned resource or location.

The security action executer 165 stops the exfiltration 806 by blocking 818 the posting of the confidential information 832 and 834 to the unsanctioned URL 824.

Figure 9:
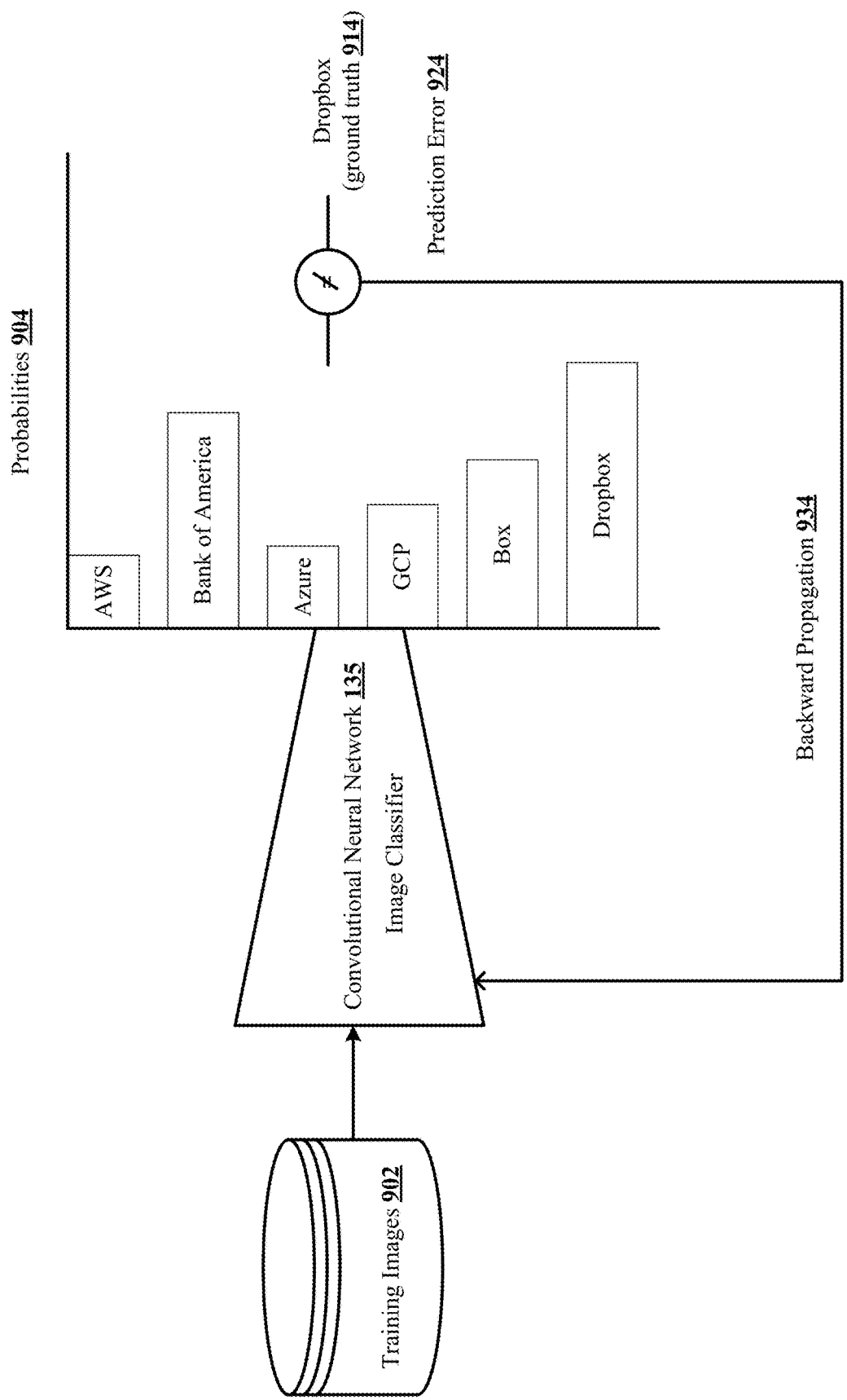
FIG. 9 shows one implementation of training an image classifier to map webpage images to hosted services.

FIG. 9 shows one implementation of training the image classifier 135 to map webpage images to hosted services. Training images 902 are used as training data for training the image classifier 135 and contain images crawled and extracted from webpages and websites of the most-commonly used sanctioned hosted services. Each image is labelled with ground truth 914 that identifies the corresponding hosted service. In one implementation, the image classifier 135 is a convolutional neural network (CNN) with a softmax classification layer that produces confidence score probabilities 904 for a plurality of hosted services (e.g., AWS, BoA, Azure, GCP, Box, Dropbox). The training uses backward propagation 934 to apply gradients calculated from the predicted error 924 to parameters and weights of the convolutional neural network.

In other implementations of the technology disclosed, in addition to or instead of the machine learning-based classification approaches, the technology disclosed can use image fingerprinting algorithms like perceptual hashing for image disambiguation and classification. Additional details about perceptual hashing can be found here Perceptual hashing, https://en.wikipedia.org/w/index.php?title=Perceptual_hashing&oldid=999157579 (last visited Jan. 25, 2021), which is incorporated by reference as if fully set forth herein.

Figure 10:
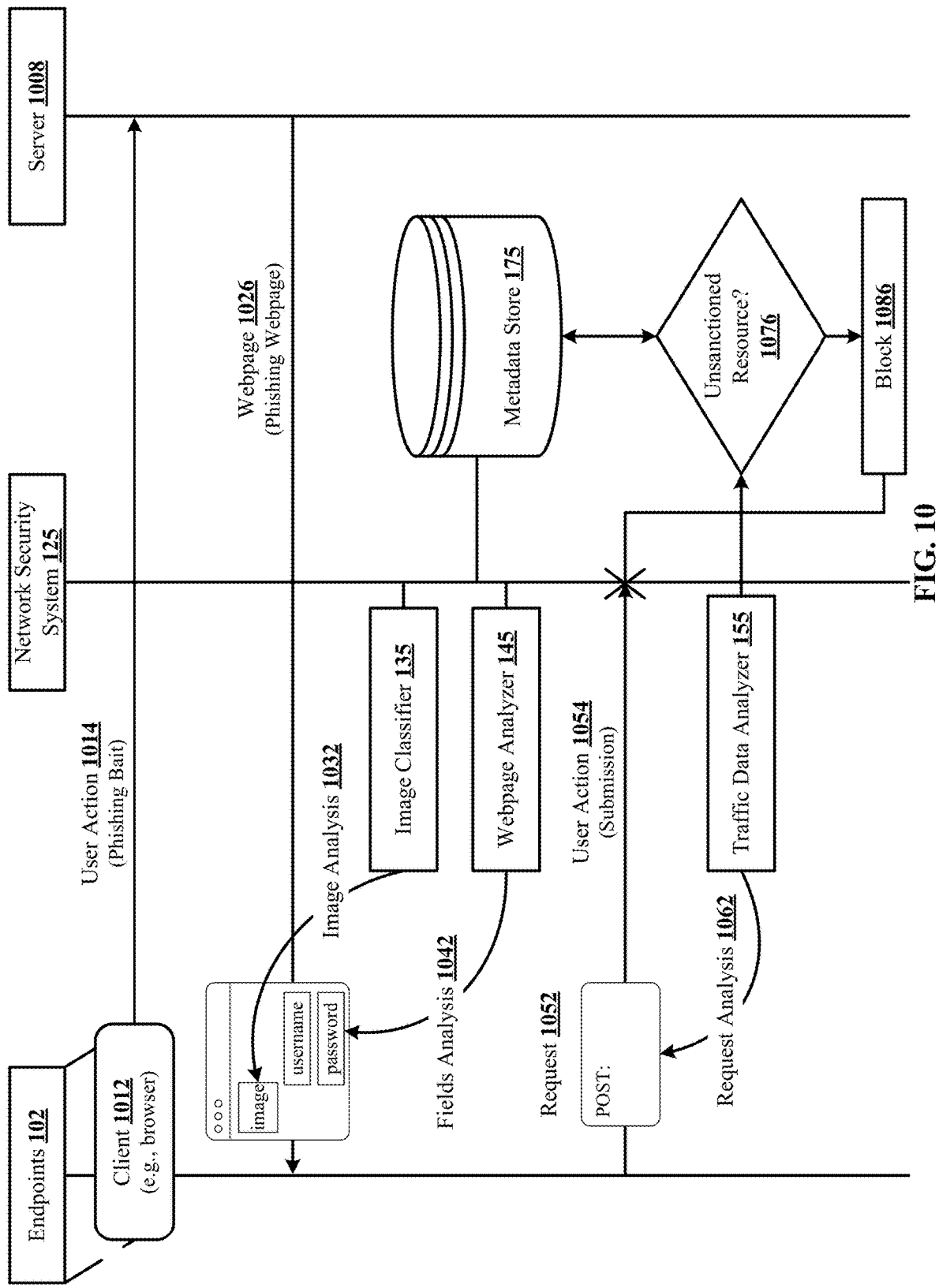
FIG. 10 is a message flow chart depicting some of the actions involved in the network security system detecting and preventing the phishing attacks.

FIG. 10 is a message flow chart depicting some of the actions involved in the network security system detecting and preventing the phishing attacks. The message flow chart can be implemented at least partially with a database system, e.g., by one or more processors configured to receive or retrieve information, process the information, store results, and transmit the results. Other implementations may perform the actions in different orders and/or with different, fewer, or additional actions than the ones illustrated in FIG. 10. Multiple actions can be combined in some implementations. For convenience, this message flow chart is described with reference to the system that carries out a method. The system is not necessarily part of the method.

Communications between the endpoints 102 and the server 1008 are monitored and mediated by the network security system 125 that is interposed in between them.

First, a user issues user action 1014 via a client 1012 (e.g., browser) running on the endpoints 102. In one implementation, the user action 1014 is selection of a hyperlink that serves as a phishing bait.

In response to the user action 1014, the server 1008 sends toward the client 1012 a phishing webpage 1026.

Then, the image classifier 135 of the network security system 125 performs image analysis 1032 of images of the phishing webpage 1026 and identifies a particular hosted service represented by the images.

Then, the webpage analyzer 145 of the network security system 125 performs field analysis 1042 of the fields of the phishing webpage 1026 and determines that the fields are eliciting confidential information.

Then, a user action 1054 attempts to submit the confidential information via the request 1052. The request 1052 is intercepted by the network security system 125 and not completed.

Then, the traffic data analyzer 155 of the network security system 125 performs request analysis 1062 of the request 1052 and determines that the confidential information is being exfiltrated to an unsanctioned resource or location. This determination is made by comparing 1076 a resource address in the request 1052 (e.g., POST URL) with one or more sanctioned resource addresses used by the particular hosted service, which are identified/listed in the metadata store 175 of the network security system 125.

Then, the network security system 125 determines that the phishing webpage is effectuating a phishing attack and blocks 1086 transmission of the confidential information to the unsanctioned resource.

In other implementations, if the comparison 1076 yields that the confidential information is being sent to a sanctioned resource or location, then the request is not blocked and instead fulfilled.

Figure 11:
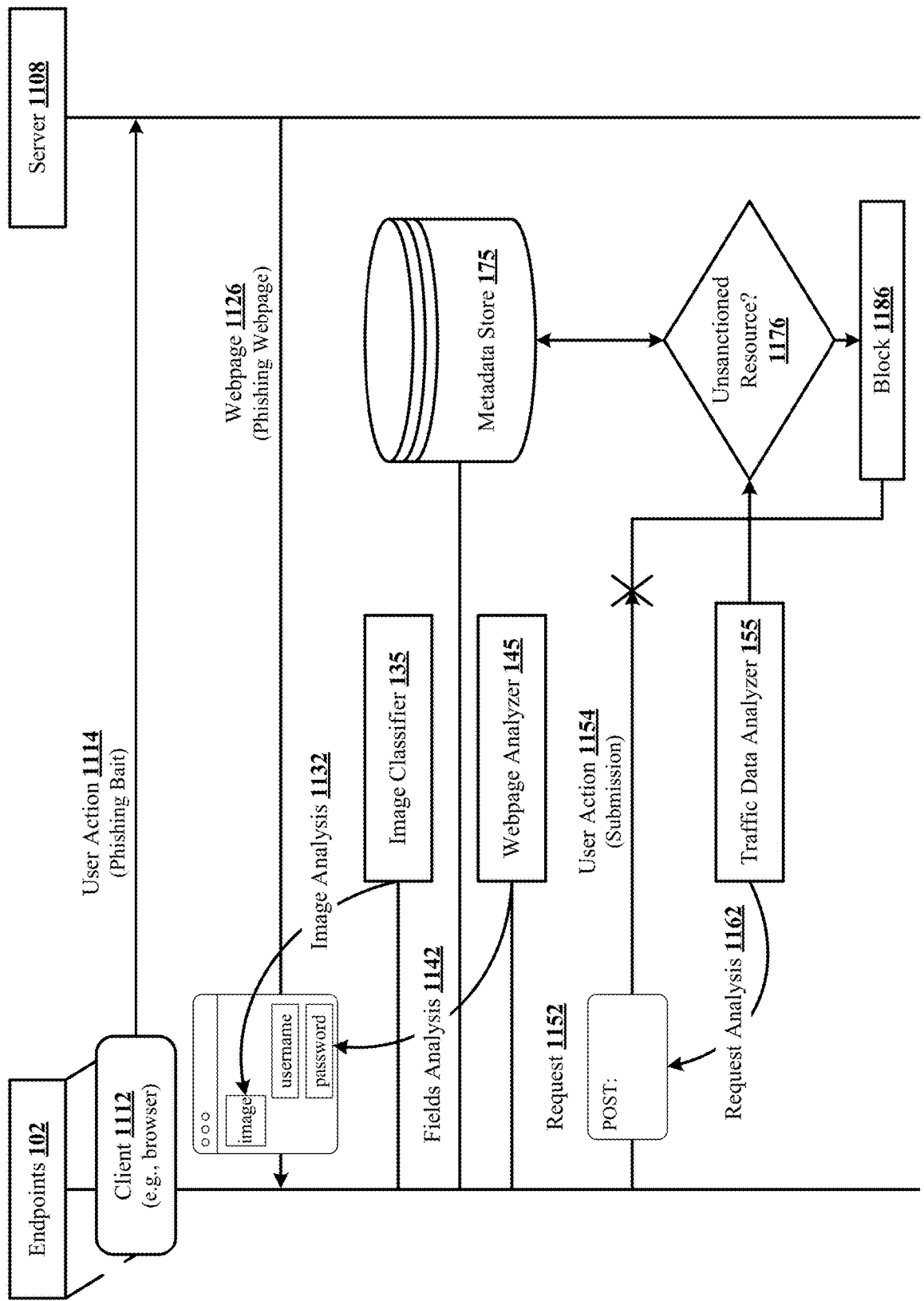
FIG. 11 is a message flow chart depicting some of the actions involved in the endpoint security system detecting and preventing the phishing attacks.

FIG. 11 is a message flow chart depicting some of the actions involved in the endpoint security system detecting and preventing the phishing attacks. The message flow chart can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 11. Multiple actions can be combined in some implementations. For convenience, this message flow chart is described with reference to the system that carries out a method. The system is not necessarily part of the method.

First, a user issues user action 1114 via a client 1112 (e.g., browser) running on the endpoints 102. In one implementation, the user action 1114 is selection of a hyperlink that serves as a phishing bait.

In response to the user action 1114, the server 1108 sends toward the client 1112 a phishing webpage 1126.

Then, the image classifier 135 of the endpoint security system 202 performs image analysis 1132 of images of the phishing webpage 1126 and identifies a particular hosted service represented by the images.

Then, the webpage analyzer 145 of the endpoint security system 202 performs field analysis 1142 of the fields of the phishing webpage 1126 and determines that the fields are eliciting confidential information.

Then, a user action 1154 attempts to submit the confidential information via the request 1152. The request 1152 is intercepted by the endpoint security system 202 and not completed.

Then, the traffic data analyzer 155 of the endpoint security system 202 performs request analysis 1162 of the request 1152 and determines that the confidential information is being exfiltrated to an unsanctioned resource or location. This determination is made by comparing 1176 a resource address in the request 1152 (e.g., POST URL) with one or more sanctioned resource addresses used by the particular hosted service, which are identified/listed in the metadata store 175 of the endpoint security system 202.

Then, the endpoint security system 202 determines that the phishing webpage is effectuating a phishing attack and blocks 1186 transmission of the confidential information to the unsanctioned resource.

In other implementations, if the comparison 1176 yields that the confidential information is being sent to a sanctioned resource or location, then the request is not blocked and instead fulfilled.

Figure 12:
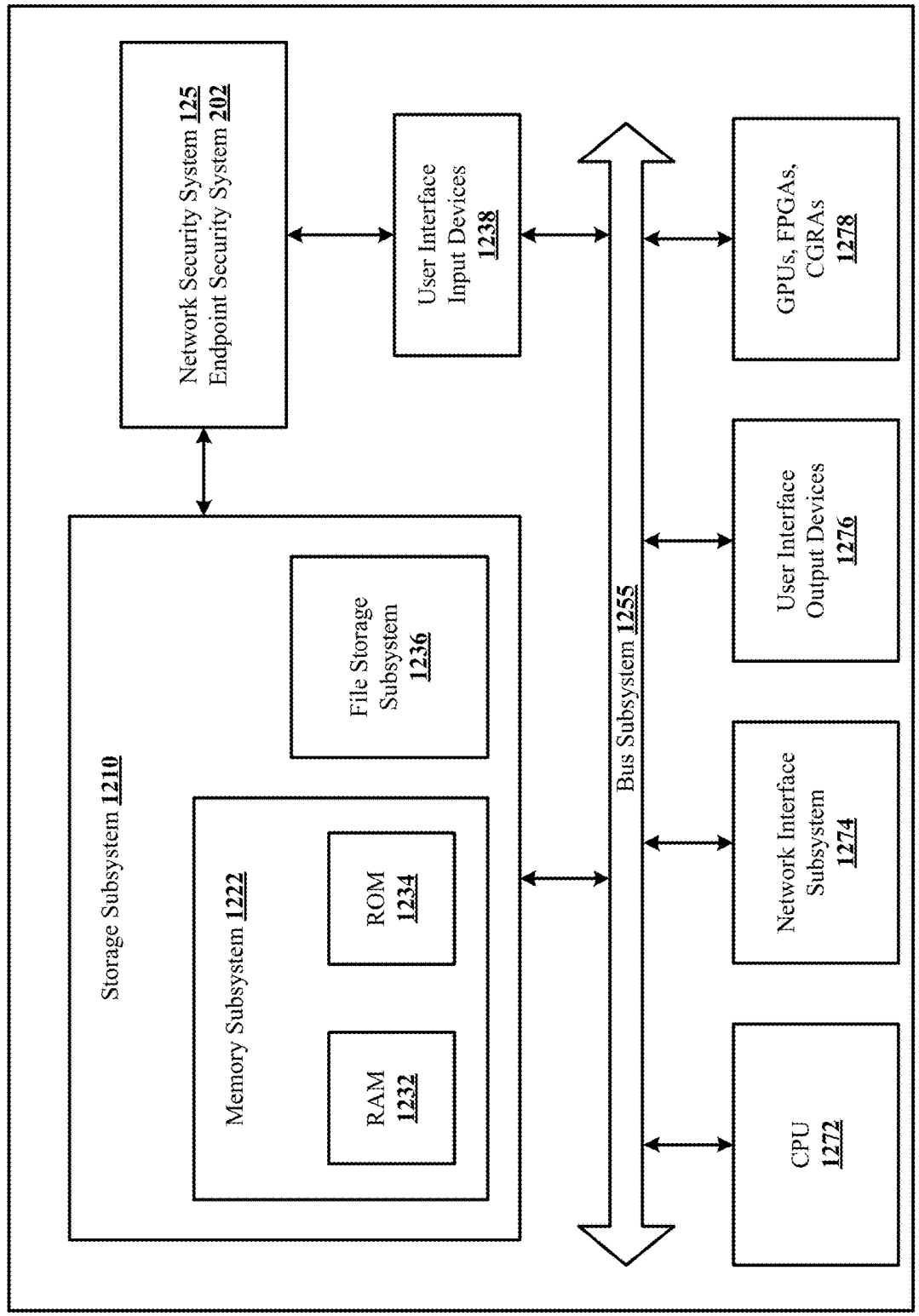
FIG. 12 is a simplified block diagram of a computer system that can be used to implement the technology disclosed.

FIG. 12 is a simplified block diagram of a computer system 1200 that can be used to implement the technology disclosed. Computer system 1200 includes at least one central processing unit (CPU) 1272 that communicates with a number of peripheral devices via bus subsystem 1255. These peripheral devices can include a storage subsystem 1210 including, for example, memory devices and a file storage subsystem 1236, user interface input devices 1238, user interface output devices 1276, and a network interface subsystem 1274. The input and output devices allow user interaction with the computer system 1200. Network interface subsystem 1274 provides an interface to outside networks, including an interface to corresponding interface devices in other computer systems.

In one implementation, the network security system 125 and/or the endpoint security system 202 are communicably linked to the storage subsystem 1210 and the user interface input devices 1238.

User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into the computer system 1200.

User interface output devices 1276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1200 to the user or to another machine or computer system.

Storage subsystem 1210 stores programming and data constructs that provide the functionality of some or all of the modules and methods described herein. Subsystem 1278 can be graphics processing units (GPUs), field-programmable gate arrays (FPGAs), or coarse-grained reconfigurable architectures.

Memory subsystem 1222 used in the storage subsystem 1210 can include a number of memories including a main random access memory (RAM) 1232 for storage of instructions and data during program execution and a read only memory (ROM) 1234 in which fixed instructions are stored. A file storage subsystem 1236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1236 in the storage subsystem 1210, or in other machines accessible by the processor.

Bus subsystem 1255 provides a mechanism for letting the various components and subsystems of computer system 1200 communicate with each other as intended. Although bus subsystem 1255 is shown schematically as a single bus, alternative implementations of the bus subsystem can use multiple busses.

Computer system 1200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1200 depicted in FIG. 12 is intended only as a specific example for purposes of illustrating the preferred embodiments of the present invention. Many other configurations of computer system 1200 are possible having more or less components than the computer system depicted in FIG. 12.

Particular Implementations

In one implementation, we disclose a computer-implemented method of detecting and preventing phishing attacks.

A network security system intercepts a webpage rendered by a server in response to a user action executed on a client. The network security system analyzes one or more images of the webpage and determines that a particular hosted service is represented by the images. The webpage is accompanied with a valid domain and certificate issued by the particular hosted service and impersonates one or more official webpages of the particular hosted service.

The network security system analyzes one or more fields of the webpage and determines that the fields elicit confidential information. The network security system intercepts a request generated by the client in response to another user action providing the confidential information via the fields.

The network security system analyses the request and determines that the confidential information is being exfiltrated to an unsanctioned resource. This determination is made by comparing a resource address in the request with one or more sanctioned resource addresses used by the particular hosted service.

The network security system determines that the webpage is effectuating a phishing attack and blocks transmission of the confidential information to the unsanctioned resource.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in these implementations can readily be combined with sets of base features identified in other implementations.

The particular hosted service can be a cloud computing and storage service and the webpage can be hosted on the cloud computing and storage service. The webpage can have a uniform resource locator (URL) of the cloud computing and storage service that is different from one or more official URLs of the particular hosted service.

The particular hosted service can be a website. The network security system can be configured with an image classifier that is trained to map webpage images to hosted services. In one implementation, the image classifier is a convolutional neural network (CNN).

The sanctioned resource addresses used by the particular hosted service can be identified in a metadata store maintained at the network security system. The sanctioned resource addresses can be identified by at least one of domain names, subdomain names, uniform resource identifiers (URIs), and URLs. The sanctioned resource addresses can be identified by at least one of Internet Protocol (IP) addresses, server name indications (SNIs), and subject alternative names (SANs).

The request can include a Hypertext Transfer Protocol (HTTP) header and the resource address can be identified in a POST field of the HTTP header. The request can include a HTTP header and the resource address can be identified in a referer field of the HTTP header.

The fields that elicit confidential information can be username and password authentication fields, PHI fields, and/or PCI fields.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In another implementation, we disclose a computer-implemented method of detecting and preventing phishing attacks.

An endpoint security system intercepts a webpage rendered by a server in response to a user action executed on a client. The endpoint security system analyzes one or more images of the webpage and determines that a particular hosted service is represented by the images. The webpage is accompanied with a valid domain and certificate issued by the particular hosted service and impersonates one or more official webpages of the particular hosted service.

The endpoint security system analyzes one or more fields of the webpage and determines that the fields elicit confidential information. The endpoint security system intercepts a request generated by the client in response to another user action providing the confidential information via the fields.

The endpoint security system analyses the request and determines that the confidential information is being exfiltrated to an unsanctioned resource. This determination is made by comparing a resource address in the request with one or more sanctioned resource addresses used by the particular hosted service.

The endpoint security system determines that the webpage is effectuating a phishing attack and blocks transmission of the confidential information to the unsanctioned resource.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in these implementations can readily be combined with sets of base features identified in other implementations.

The particular hosted service can be a cloud computing and storage service and the webpage can be hosted on the cloud computing and storage service. The webpage can have a uniform resource locator (URL) of the cloud computing and storage service that is different from one or more official URLs of the particular hosted service.

The particular hosted service can be a website. The endpoint security system can be configured with an image classifier that is trained to map webpage images to hosted services. In one implementation, the image classifier is a convolutional neural network (CNN).

The sanctioned resource addresses used by the particular hosted service can be identified in a metadata store maintained at the endpoint security system. The sanctioned resource addresses can be identified by at least one of domain names, subdomain names, uniform resource identifiers (URIs), and URLs. The sanctioned resource addresses can be identified by at least one of Internet Protocol (IP) addresses, server name indications (SNIs), and subject alternative names (SANs).

The request can include a Hypertext Transfer Protocol (HTTP) header and the resource address can be identified in a POST field of the HTTP header. The request can include a HTTP header and the resource address can be identified in a referer field of the HTTP header.

The fields that elicit confidential information can be username and password authentication fields, PHI fields, and/or PCI fields.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Clauses

We disclose the following clauses:

1. A computer-implemented method of machine learning-based data loss prevention (DLP), the method including:
   providing input characterizing content to a machine learning model trained to determine whether the content is sensitive or not sensitive;
   processing the input through the machine learning model and translating analysis by the machine learning model into an alternative representation of the input; and
   processing the alternative representation through an output layer and classifying the content as sensitive or not sensitive.
2. The computer-implemented method of clause 1, wherein the content is image data, and the machine learning model is a convolutional neural network (CNN).
3. The computer-implemented method of clause 1, wherein the content is text data, and the machine learning model is a recurrent neural network (RNN).
4. The computer-implemented method of clause 1, wherein the content is text data, and the machine learning model is an attention-based neural network (e.g., Transformer, Bert).
5. The computer-implemented method of clause 1, wherein the machine learning model is trained on training examples that are signatures of sensitive content and annotated with sensitive ground truth label for training.
6. The computer-implemented method of clause 1, wherein the machine learning model is trained on training examples that are signatures of non-sensitive content and annotated with non-sensitive ground truth label for training.
7. A computer-implemented method of machine learning-based threat detection, the method including:
   providing input characterizing a potential threat signature to a machine learning model trained to determine whether the potential threat signature is malicious or not malicious;
   processing the input through the machine learning model and translating analysis by the machine learning model into an alternative representation of the input; and
   processing the alternative representation through an output layer and classifying the potential threat signature as malicious or not malicious.
8. The computer-implemented method of clause 7, wherein the potential threat signature is image data, and the machine learning model is a convolutional neural network (CNN).
9. The computer-implemented method of clause 7, wherein the potential threat signature is text data, and the machine learning model is a recurrent neural network (RNN).
10. The computer-implemented method of clause 7, wherein the potential threat signature is text data, and the machine learning model is an attention-based neural network (e.g., Transformer, Bert).
11. The computer-implemented method of clause 7, wherein the machine learning model is trained on training examples that are signatures of real threats and annotated with malicious ground truth label for training.
12. The computer-implemented method of clause 7, wherein the machine learning model is trained on training examples that are signatures of fake threats and annotated with non-malicious ground truth label for training.
13. A computer-implemented method of machine learning-based threat detection, the method including:
    providing input characterizing a potential threat signature to a machine learning model trained to determine whether the potential threat signature is of a first threat type or a second threat type;
    processing the input through the machine learning model and translating analysis by the machine learning model into an alternative representation of the input; and
    processing the alternative representation through an output layer and classifying the potential threat signature as the first threat type or the second threat type.
14. The computer-implemented method of clause 13, wherein the potential threat signature is image data, and the machine learning model is a convolutional neural network (CNN).
15. The computer-implemented method of clause 13, wherein the potential threat signature is text data, and the machine learning model is a recurrent neural network (RNN).
16. The computer-implemented method of clause 13, wherein the potential threat signature is text data, and the machine learning model is an attention-based neural network (e.g., Transformer, Bert).

17. The computer-implemented method of clause 13, wherein the machine learning model is trained on training examples that are signatures of the first threat type and annotated with first threat type ground truth label for training.
18. The computer-implemented method of clause 13, wherein the machine learning model is trained on training examples that are signatures of the second threat type and annotated with second threat type ground truth label for training.
19. The computer-implemented method of clause 13, further including:
   providing input characterizing a potential threat signature to a machine learning model trained to determine whether the potential threat signature is of the first threat type, the second threat type, or a third threat type;
   processing the input through the machine learning model and translating analysis by the machine learning model into an alternative representation of the input; and
   processing the alternative representation through an output layer and classifying the potential threat signature as the first threat type, the second threat type, or the third threat type.
20. The computer-implemented method of clause 19, wherein the machine learning model is trained on training examples that are signatures of the third threat type and annotated with third threat type ground truth label for training.
21. A computer-implemented method of machine learning-based classification of cloud applications (hosted services), the method including:
   providing input characterizing content to a machine learning model trained to determine which cloud application the content identifies from among a plurality of cloud applications (e.g., Box, Google Drive, Gmail, Office365, Outlook, Word, Excel, Dropbox, etc.);
   processing the input through the machine learning model and translating analysis by the machine learning model into an alternative representation of the input; and
   processing the alternative representation through an output layer and classifying the content as identifying a particular cloud application from among the plurality of cloud applications.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in these implementations can readily be combined with sets of base features identified in other implementations.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A computer-implemented method of detecting and preventing phishing attacks, the method including:
   a network security system intercepting a webpage rendered by a server in response to a user action executed on a client;
   the network security system analyzing one or more images of the webpage and determining that the webpage is hosted by a particular hosted service represented by the one or more images, wherein the webpage is accompanied with a valid domain and certificate issued by the particular hosted service and impersonates one or more official webpages of the particular hosted service;
   the network security system analyzing one or more fields of the webpage and determining that the one or more fields elicit confidential information;
   the network security system intercepting a request generated by the client in response to another user action providing the confidential information via the one or more fields, wherein the request comprises uploading the confidential information to a resource address different than a Uniform Resource Locator (URL) of the webpage;
   the network security system analyzing the request and determining that the confidential information is being exfiltrated to an unsanctioned resource, the analyzing the request comprising:
      parsing a header of the request to identify the confidential information and the resource address,
      identifying one or more sanctioned resource addresses associated with the particular hosted service,
      comparing substrings of the resource address with substrings of the one or more sanctioned resource addresses, and
      determining, based on the comparing, that the resource address is not one of the one or more sanctioned resource addresses; and
   the network security system determining that the webpage is effectuating a phishing attack based on the analyzing the request and, in response, blocking transmission of the confidential information to the unsanctioned resource.
2. The computer-implemented method of claim 1, wherein the particular hosted service is a cloud computing and storage service and the webpage is hosted on the cloud computing and storage service.
3. The computer-implemented method of claim 2, wherein the URL of the webpage is a URL associated with the cloud computing and storage service that is different from one or more official URLs of the particular hosted service.
4. The computer-implemented method of claim 1, wherein the particular hosted service is a website.
5. The computer-implemented method of claim 1, wherein the network security system is configured with an image classifier that is trained to map webpage images to hosted services.
6. The computer-implemented method of claim 5, wherein the image classifier is a convolutional neural network (CNN).

7. The computer-implemented method of claim 1, wherein the one or more sanctioned resource addresses associated with the particular hosted service are identified in a metadata store maintained at the network security system.

8. The computer-implemented method of claim 7, wherein the one or more sanctioned resource addresses are identified by at least one of domain names, subdomain names, uniform resource identifiers (URIs), and URLs.

9. The computer-implemented method of claim 7, wherein the one or more sanctioned resource addresses are identified by at least one of Internet Protocol (IP) addresses, server name indications (SNIs), and subject alternative names (SANs).

10. The computer-implemented method of claim 1, wherein the request includes a Hypertext Transfer Protocol (HTTP) header and the resource address is identified in a POST field of the HTTP header.

11. The computer-implemented method of claim 1, wherein the request includes a HTTP header and the resource address is identified in a referer field of the HTTP header.

12. The computer-implemented method of claim 1, wherein the one or more fields that elicit confidential information are username and password authentication fields.

13. A computer-implemented method of detecting and preventing phishing attacks, the method including:
    an endpoint security system intercepting a webpage rendered by a server in response to a user action executed on a client;
    the endpoint security system analyzing one or more images of the webpage and determining that the webpage is hosted by a particular hosted service represented by the one or more images, wherein the webpage is accompanied with a valid domain and certificate issued by the particular hosted service and impersonates one or more official webpages of the particular hosted service;
    the endpoint security system analyzing one or more fields of the webpage and determining that the one or more fields elicit confidential information;
    the endpoint security system intercepting a request generated by the client in response to another user action providing the confidential information via the one or more fields, wherein the request comprises uploading the confidential information to a resource address different than a Uniform Resource Locator (URL) of the webpage;
    the endpoint security system analyzing the request and determining that the confidential information is being exfiltrated to an unsanctioned resource, the analyzing the request comprising:
        parsing a header of the request to identify the confidential information and the resource address,
        identifying one or more sanctioned resource addresses associated with the particular hosted service,
        comparing substrings of the resource address with substrings of the one or more sanctioned resource addresses, and
        determining, based on the comparing, that the resource address is not one of the one or more sanctioned resource addresses; and
    the endpoint security system determining that the webpage is effectuating a phishing attack based on the analyzing the request and, in response, blocking transmission of the confidential information to the unsanctioned resource.

14. The computer-implemented method of claim 13, wherein the endpoint security system is configured with an image classifier that is trained to map webpage images to hosted services.

15. The computer-implemented method of claim 13, wherein the one or more sanctioned resource addresses associated with the particular hosted service are identified in a metadata store maintained at the endpoint security system.

16. A non-transitory computer readable storage medium impressed with computer program instructions that, upon execution by one or more processors, cause the one or more processors to:
    intercept a webpage rendered by a server in response to a user action executed on a client;
    analyze one or more images of the webpage and determine that the webpage is hosted by a particular hosted service represented by the one or more images, wherein the webpage is accompanied with a valid domain and certificate issued by the particular hosted service and impersonates one or more official webpages of the particular hosted service;
    analyze one or more fields of the webpage and determine that the one or more fields elicit confidential information;
    intercept a request generated by the client in response to another user action providing the confidential information via the one or more fields, wherein the request comprises uploading the confidential information to a resource address different than a Uniform Resource Locator (URL) of the webpage;
    analyze the request and determine that the confidential information is being exfiltrated to an unsanctioned resource, the computer program instructions to analyze the request comprising instructions that, upon execution, cause the one or more processors to:
        parse a header of the request to identify the confidential information and the resource address,
        identify one or more sanctioned resource addresses associated with the particular hosted service,
        compare substrings of the resource address with substrings of the one or more sanctioned resource addresses, and
        determine, based on the compare, that the resource address is not one of the one or more sanctioned resource addresses; and
    determine that the webpage is effectuating a phishing attack based on the analyze the request and, in response, block transmission of the confidential information to the unsanctioned resource.

17. The non-transitory computer readable storage medium of claim 16, wherein the computer program instructions to analyze the one or more images of the webpage comprise further instructions that, upon execution by the one or more processors, cause the one or more processors to:
    map the one or more images to the particular hosted service using an image classifier trained to map webpage images to hosted services.

18. A system, comprising:
    one or more hardware processors; and
    a memory having stored thereon instructions that, upon execution by the one or more hardware processors, cause the one or more hardware processors to:
    intercept a webpage rendered by a server in response to a user action executed on a client;
    analyze one or more images of the webpage and determine that the webpage is hosted by a particular hosted service represented by the one or more images, wherein the webpage is accompanied with a valid domain and certificate issued by the particular hosted service and impersonates one or more official webpages of the particular hosted service;

analyze one or more fields of the webpage and determine that the one or more fields elicit confidential information;

intercept a request generated by the client in response to another user action providing the confidential information via the one or more fields, wherein the request comprises uploading the confidential information to a resource address different than a Uniform Resource Locator (URL) of the webpage;

analyze the request and determine that the confidential information is being exfiltrated to an unsanctioned resource, the instructions to analyze the request comprising further instructions that, upon execution, cause the one or more hardware processors to:

parse a header of the request to identify the confidential information and the resource address, identify one or more sanctioned resource addresses associated with the particular hosted service, compare substrings of the resource address with substrings of the one or more sanctioned resource addresses, and determine, based on the compare, that the resource address is not one of the one or more sanctioned resource addresses; and determine that the webpage is effectuating a phishing attack based on the analyze the request and, in response, block transmission of the confidential information to the unsanctioned resource.

19. The system of claim 18, wherein the instructions to analyze the one or more images of the webpage comprise further instructions that, upon execution by the one or more hardware processors, cause the one or more hardware processors to:

map the one or more images to the particular hosted service using an image classifier trained to map webpage images to hosted services.

* * * * *